United States Patent
Saiki et al.

(10) Patent No.: US 8,168,152 B2
(45) Date of Patent: May 1, 2012

(54) METHOD FOR PRODUCING TRICHLOROSILANE AND METHOD FOR UTILIZING TRICHLOROSILANE

(75) Inventors: Wataru Saiki, Hitachinaka (JP); Kazuki Mizushima, Saitama (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 13/095,997

(22) Filed: Apr. 28, 2011

(65) Prior Publication Data

US 2011/0200512 A1 Aug. 18, 2011

Related U.S. Application Data

(63) Continuation-in-part of application No. PCT/JP2009/005804, filed on Oct. 30, 2009.

(30) Foreign Application Priority Data

Oct. 30, 2008 (JP) ................................ 2008-280591
Oct. 30, 2008 (JP) ................................ 2008-280592

(51) Int. Cl.
  *C01B 33/107* (2006.01)
(52) U.S. Cl. ........................................ 423/342; 423/341
(58) Field of Classification Search .................. 423/341, 423/342
  See application file for complete search history.

(56) References Cited

U.S. PATENT DOCUMENTS

| | | | | |
|---|---|---|---|---|
| 4,165,363 A | | 8/1979 | Weigert et al. | |
| 5,063,040 A | * | 11/1991 | Ruff | 423/342 |
| 5,906,799 A | * | 5/1999 | Burgie et al. | 422/241 |
| 2008/0112875 A1 | | 5/2008 | Garcia-Alonso et al. | |
| 2009/0285743 A1 | * | 11/2009 | Mizushima et al. | 423/342 |
| 2009/0324477 A1 | * | 12/2009 | Mizushima et al. | 423/342 |
| 2010/0178230 A1 | * | 7/2010 | Saika et al. | 423/342 |

FOREIGN PATENT DOCUMENTS

| | | |
|---|---|---|
| JP | 57-038524 A | 12/1973 |
| JP | 57-156318 A | 9/1982 |
| JP | 61-063519 A | 4/1986 |
| JP | 3781439 B2 | 10/1994 |
| JP | 2008-156209 A | 7/2008 |
| JP | 2008-528433 A | 7/2008 |
| JP | 2009-007240 A | 1/2009 |

OTHER PUBLICATIONS

International Search Report issued on the related PCT (PCT/JP2009/005804) with English translation thereof, Feb. 2010.

* cited by examiner

*Primary Examiner* — Ngoc-Yen Nguyen
(74) *Attorney, Agent, or Firm* — Edwards Wildman Palmer LLP

(57) ABSTRACT

The present invention relates to a method for producing trichlorosilane. In this method for producing trichlorosilane, first, silicon tetrachloride and hydrogen are subjected to a conversion reaction at a temperature of equal to or higher than 1000° C. and equal to or lower than 1900° C., to produce a reaction gas containing trichlorosilane, dichlorosilylene, hydrogen chloride and high-order silane compounds, and then the reaction gas discharged from the conversion furnace is cooled to 600° C. or higher within 0.01 seconds from the initiation of cooling and to 500° C. or lower within 2 seconds. Subsequently, the reaction gas is maintained in a temperature range of equal to or higher than 500° C. and equal to or lower than 950° C. for a time period of equal to or longer than 0.01 seconds and equal to or shorter than 5 seconds. The reaction gas is further cooled to below 500° C.

8 Claims, 11 Drawing Sheets

METHOD FOR PRODUCING TRICHLOROSILANE AND METHOD FOR UTILIZING TRICHLOROSILANE

This application is a Continuation-in-Part of PCT/JP2009/005804, filed Oct. 30, 2009, and claims the right of priority under 35 U.S.C. §119 based on Japanese Patent Application Nos. 2008-280591 filed Oct. 30, 2008 and 2008-280592 filed Oct. 30, 2008.

TECHNICAL FIELD

The present invention relates to a method for producing trichlorosilane that converts silicon tetrachloride and hydrogen to trichlorosilane by making silicon tetrachloride and hydrogen react with each other, and relate to the method having an excellent recovery effect for trichlorosilane.

This application claims priorities based on Japanese Patent Application No. 2008-280591 filed in the Japanese Patent Office on Oct. 30, 2008, and on Japanese Patent Application No. 2008-280592 filed in the Japanese Patent Office on Oct. 30, 2008, the contents of which are incorporated herein by reference. Furthermore, this application is a continuation-in-part of International PCT Application No. PCT/JP2009/005804.

BACKGROUND ART

High purity polycrystalline silicon can be produced, for example, by a hydrogen reduction of trichlorosilane represented by the following formula (1), and a thermal decomposition of trichlorosilane represented by the following formula (2), using trichlorosilane ($SiHCl_3$: referred to as TCS), silicon tetrachloride ($SiCl_4$: referred to as STC) and hydrogen as raw materials:

$$SiHCl_3 + H_2 \rightarrow Si + 3HCl \quad (1)$$

$$4SiHCl_3 \rightarrow Si + 3SiCl_4 + 2H_2 \quad (2)$$

Trichlorosilane used for a raw material of the producing method described above, is obtained by making metallurgical grade silicon react with hydrogen chloride, thereby producing crude trichlorosilane, and purifying this trichlorosilane by distillation. Furthermore, trichlorosilane can also be produced using silicon tetrachloride that is recovered by distillation separation from the discharged gas of a polycrystalline silicon-producing reaction, as a raw material, by a hydrogen-addition conversion reaction represented by the following formula (3):

$$SiCl_4 + H_2 \rightarrow SiHCl_3 + HCl \quad (3)$$

As an apparatus for producing this trichlorosilane, a conversion reaction apparatus (converter furnace) which is described in Patent Document 1 is known. This conversion reaction apparatus is provided with a reaction chamber having a double-chamber consisting of an outer chamber and an inner chamber formed by two concentric tubes surrounded by a heating element, and a heat exchanger disposed below this reaction chamber. Furthermore, a raw material gas supply pipeline that supplies hydrogen and silicon tetrachloride to the reaction chamber, and a discharge pipeline that discharges the reaction product gas from the reaction chamber are connected to each other through the heat exchanger. In the heat exchanger, the supply gas that is supplied to the reaction chamber is preheated as heat is transferred from the reaction product gas discharged from the reaction chamber, and at the same time, the supply gas cools the discharged reaction product gas.

Furthermore, Patent Document 2 discloses that a reaction product gas containing trichlorosilane and hydrogen chloride is obtained by introducing silicon tetrachloride and hydrogen into a reaction chamber, and subjecting the components to a conversion reaction at a temperature of 600° C. to 1200° C. As a producing apparatus for trichlorosilane, an apparatus provided with a cooling unit which rapidly cools the reaction product gas discharged from the reaction chamber, at a cooling rate such that, for example, the temperature reaches 300° C. or below within 1 second, is suggested.

PATENT DOCUMENT (Patent Document 1) Japanese Patent No. 3781439
(Patent Document 2) Japanese Examined Patent Application Second Publication No. S 57-38524

DISCLOSURE OF INVENTION

Technical Problem

In the producing apparatus for trichlorosilane described in Patent Document 1, cooling of the reaction product gas is achieved by exchanging heat with the supplied raw material gas in the heat exchanger disposed below the reaction chamber. However, during the process of cooling the reaction product gas, a reverse reaction of the reaction formula (3) occurs, in which trichlorosilane reacts with hydrogen chloride and is decomposed into silicon tetrachloride (STC) and hydrogen. During the cooling by a conventional heat exchanger which performs cooling with the raw material gas, where the cooling rate is low, the reverse reaction cannot be sufficiently suppressed, and there is a problem that the conversion ratio of silicon tetrachloride to trichlorosilane is deteriorated.

Furthermore, as described in Patent Document 2, the reverse reaction of the reaction formula (3) can be suppressed by performing rapid cooling within an extremely short period of time such as 1 second or less, to a temperature range of 300° C. or less in which the reverse reaction hardly occurs. However, when rapid cooling is performed in such the extremely short time, it is known that during the cooling process, $SiCl_2$ (dichlorosilylene) contained in the reaction gas and chlorosilanes, such as $SiCl_4$, react with each other, and a polymer is produced as a by-product, as shown in the following formula (4). This $SiCl_2$ is produced in a large amount at high temperatures during this conversion reaction, and is produced in a significant amount particularly at a temperature higher than 1200° C., so that $SiCl_2$ is contained in the reaction gas discharged from the conversion furnace.

$$SiCl_2 + SiCl_4 \rightarrow Si_2Cl_6 \quad (4)$$

The polymer collectively refers to high-order chlorosilanes containing two or more silicon atoms, such as $Si_2Cl_6$ (chlorodisilane), $Si_3Cl_8$ (chlorotrisilane), and $Si_2H_2Cl_4$.

Thus, when rapid cooling is performed in the extremely short period of time, decomposition of trichlorosilane (the reverse reaction of the formula (3)) during cooling is suppressed, and the amount of consumption of trichlorosilane is reduced. However, problems occur such as an increase in the amount of polymer produced, and deposition of the polymer on the pipelines after the cooling process. On the other hand, when the cooling rate is low, the amount of polymer produced is decreased, but the decomposition of trichlorosilane proceeds, and the recovery ratio of trichlorosilane is decreased.

Therefore, it is necessary to control cooling rate of the reaction gas discharged from the conversion furnace at an appropriate value. However, the reaction gas discharged from the conversion furnace is at a high temperature such as 1000° C. or higher, and in the case of rapidly cooling this gas, it is difficult to appropriately control the cooling rate in the high temperature region of 600° C. or higher, where trichlorosilane is likely to be decomposed. For this reason, priority has been given to raising the recovery ratio of trichlorosilane in the related art, and cooling has been carried out at an excessively high cooling rate.

Accordingly, although the recovery ratio of trichlorosilane is high, there is a problem that the generation of polymer attributed to rapid cooling cannot be suppressed, and the burden of the operation for removing the polymer deposited on pipelines is heavy. Particularly, since a distribution occurs in the cooling rate as the size of the apparatus increases, it is difficult to appropriately control the overall cooling rate of the gas, and the cooling rate may increase drastically in a localized manner. Therefore, it is not easy to sufficiently control the generation of the polymer.

The present invention is intended to solve the problems of the related art as described above, and provides a method for producing trichlorosilane, which effectively suppresses the decomposition of trichlorosilane and the production of a polymer during a process of cooling the gas produced by a conversion reaction, poses a lower burden during the operation for polymer removal, and provides a high recovery ratio of trichlorosilane.

Solution to Problem

A first embodiment of the present invention provides a method for producing trichlorosilane which solves the problems described above by having the following constitution.

(A1) A method for producing trichlorosilane by cooling a reaction gas and recovering trichlorosilane, the method includes:

a reaction gas producing step in which silicon tetrachloride and hydrogen, as raw material, are subject to a conversion reaction at a temperature of equal to or higher than 1000° C. and equal to or lower than 1900° C., to produce a reaction gas containing trichlorosilane, dichlorosilylene, hydrogen chloride and high-order silane compounds;

a cooling step 1A in which the reaction gas discharged from the conversion furnace after the reaction gas producing step is cooled to 600° C. or higher within 0.01 seconds from the initiation of cooling and to 500° C. or lower within 2 seconds;

an intermediate reaction step in which the reaction gas discharged after the first cooling step 1A is maintained in a temperature range of equal to or higher than 500° C. and equal to or lower than 950° C. for a time period of equal to or longer than 0.01 seconds and equal to or shorter than 5 seconds; and a second cooling step in which the reaction gas discharged after the intermediate reaction step is cooled to below 500° C.

(A2) The method for producing trichlorosilane described in the above item (A1), wherein in the cooling step 1A, the achieving cooling temperature of the reaction gas is equal to or higher than 100° C. and equal to or lower than 500° C.

(A3) The method for producing trichlorosilane described in the above item (A1), wherein in the intermediate reaction step, the reaction gas is maintained at a temperature of equal to or higher than 550° C. and equal to or lower than 800° C.

(A4) The method for producing trichlorosilane described in the above item (A1), wherein in the cooling step 1A, the reaction gas is cooled such that the achieving cooling temperature is equal to or higher than 100° C. and equal to or lower than 500° C., and the cooled reaction gas is maintained at a temperature equal to or higher than 550° C. and equal to or lower than 800° C. in the intermediate reaction step.

(A5) A method for utilizing trichlorosilane, includes using the trichlorosilane recovered according to the method described in any one of the above items (A1) to (A4), as a portion of the producing raw materials for polycrystalline silicon.

In the producing method according to the first embodiment of the present invention, first, raw material silicon tetrachloride and hydrogen are subjected to a conversion reaction at a temperature of equal to or higher than 1000° C. and equal to or lower than 1900° C., and thus a reaction gas containing trichlorosilane, dichlorosilylene, hydrogen chloride and high-order silane compounds is produced. Thereafter, the reaction gas discharged from the conversion furnace is cooled to 600° C. or higher within 0.01 seconds from the initiation of cooling, and to 500° C. or lower within 2 seconds, preferably such that the achieving cooling temperature is equal to or higher than 100° C. and lower than 500° C. (cooling step 1A). According to this cooling method, the decomposition of trichlorosilane contained in the reaction gas (the reverse reaction of the formula (3)) can be effectively suppressed.

In the cooling step 1A, rapid cooling of the reaction gas causes the producing a small amount of a polymer. However, according to the first embodiment of the present invention, the rapidly cooled reaction gas is maintained, in the intermediate reaction step, in a temperature range of equal to or higher than 500° C. and equal to or lower than 950° C., and preferably equal to or higher than 550° C. and equal to or lower than 800° C., for a time period of equal to or longer than 0.01 seconds and equal to or shorter than 5 seconds. This intermediate reaction step allows the polymer contained in the reaction gas to be sufficiently decomposed. On the other hand, since the upper limit of the retention temperature is limited to 950° C. or lower, and preferably 800° C. or lower in this intermediate reaction step, the retention temperature is sufficiently lower than the cooling initiation temperature of the cooling step 1A (generally 1000° C. or higher), and therefore, the decomposition of trichlorosilane in the reaction gas is suppressed.

According to the first embodiment of the present invention, the reaction gas in which the polymer has been decomposed by the intermediate reaction step is cooled finally to below 500° C. in the second cooling step, and trichlorosilane is recovered.

A second embodiment of the present invention provides a method for producing trichlorosilane, which solves the problems described above by having the following constitution.

(B1) A method for producing trichlorosilane by cooling a reaction gas and recovering trichlorosilane, the method includes:

a reaction gas producing step in which silicon tetrachloride and hydrogen, as raw material, are subjected to a conversion reaction at a temperature of equal to or higher than 1000° C. and equal to or lower than 1900° C., to produce a reaction gas containing trichlorosilane, dichlorosilylene, hydrogen chloride and high-order silane compounds;

a cooling step 1B in which the reaction gas discharged from the conversion furnace after the reaction gas producing step is cooled to below 600° C. within 0.01 seconds;

an intermediate reaction step in which the reaction gas discharged after the first cooling step 1B is maintained in a temperature range of equal to or higher than 500° C. and equal to or lower than 950° C. for a time period of equal to or longer than 0.01 seconds and equal to or shorter than 5 seconds; and a second cooling step of in which the reaction gas discharged after the intermediate reaction step is cooled to below 500° C.

(B2) The method for producing trichlorosilane described in the above item (B1), wherein in the cooling step 1B, the achieving cooling temperature of the reaction gas is equal to or higher than 100° C. and equal to or lower than 500° C.

(B3) The method for producing trichlorosilane described in the above item (B1), wherein in the intermediate reaction step, the reaction gas is maintained at a temperature of equal to or higher than 550° C. and equal to or lower than 800° C.

(B4) The method for producing trichlorosilane described in the above item (B1), wherein in the cooling step 1B, the reaction gas is cooled to a achieving cooling temperature of equal to or higher than 100° C. and equal to or lower than 500° C., and the cooled reaction gas is maintained at a temperature equal to or higher than 550° C. and equal to or lower than 800° C. in the intermediate reaction step.

(B5) A method for utilizing trichlorosilane, includes using the trichlorosilane recovered according to the method described in any one of the above items (B1) to (B4), as a portion of the raw materials for producing polycrystalline silicon.

In the producing method according to the second embodiment of the present invention, first, raw materials silicon tetrachloride and hydrogen are subjected to a conversion reaction at a temperature of equal to or higher than 1000° C. and equal to or lower than 1900° C., and thus a reaction gas containing trichlorosilane, dichlorosilane, hydrogen chloride and high-order silane compounds is produced. Thereafter, the reaction gas discharged from the conversion furnace is cooled to below 600° C. within a short time of 0.01 seconds or less, preferably such that the achieving cooling temperature is equal to or higher than 100° C. and lower than 500° C. (cooling step 1B). According to this cooling method, the decomposition of trichlorosilane contained in the reaction gas (the reverse reaction of the formula (3)) can be effectively suppressed.

In the cooling step 1B, rapid cooling of the reaction gas causes the producing of a polymer. However, according to the second embodiment of the present invention, the rapidly cooled reaction gas is maintained, in the intermediate reaction step, in a temperature range of equal to or higher than 500° C. and equal to or lower than 950° C., and preferably equal to or higher than 550° C. and equal to or lower than 800° C., for a time period of equal to or longer than 0.01 seconds and equal to or shorter than 5 seconds. This intermediate reaction step allows the polymer contained in the reaction gas to be sufficiently decomposed. On the other hand, since the upper limit of the retention temperature is limited to 950° C. or lower, and preferably 800° C. or lower in this intermediate reaction step, the retention temperature is sufficiently lower than the cooling initiation temperature of the cooling step 1B (generally 1000° C. or higher), and therefore, the decomposition of trichlorosilane in the reaction gas is suppressed.

According to the second embodiment of the present invention, the reaction gas in which the polymer has been decomposed by the intermediate reaction step is cooled finally to below 500° C. in the second cooling step, and trichlorosilane is recovered.

ADVANTAGEOUS EFFECTS OF INVENTION

In the production method of the present invention, the decomposition of the trichlorosilane contained in the reaction gas and the producing of the polymer are suppressed through the cooling step 1A and the intermediate reaction step, or through the cooling step 1B and the intermediate reaction step, and therefore, trichlorosilane can be recovered with a high recovery ratio. Furthermore, since the reaction gas discharged after the second cooling does not substantially contain any polymer, problems such as deposition on pipelines can be reduced, and soundness of the apparatus can be retained.

BEST MODE FOR CARRYING OUT THE INVENTION

The method for producing trichlorosilane according to the present invention will be specifically described based on preferred embodiments.

First Embodiment

The method for producing trichlorosilane of the present invention is a method of subjecting silicon tetrachloride and hydrogen, as raw material, to a conversion reaction at a temperature of equal to or higher than 1000° C. and equal to or lower than 1900° C., producing a reaction gas containing trichlorosilane, dichlorosilylene, hydrogen chloride and high-order silane compounds, and cooling this reaction gas to recover trichlorosilane. The method for producing trichlorosilane of the present invention according to a first embodiment is characterized by including a cooling step 1A in which the reaction gas discharged from the conversion furnace after the reaction gas producing step is cooled to 600° C. or higher within 0.01 seconds from the initiation of cooling and to 500° C. or lower within 2 seconds, an intermediate reaction step in which the reaction gas discharged after the first cooling step 1A is maintained in a temperature range of equal to or higher than 500° C. and equal to or lower than 950° C. for a time period of equal to or longer than 0.01 seconds and equal to or shorter than 5 seconds, and a second cooling step in which the reaction gas discharged after the intermediate reaction step is cooled to below 500° C.

(Polycrystalline Silicon Producing Step)

Figure 1:
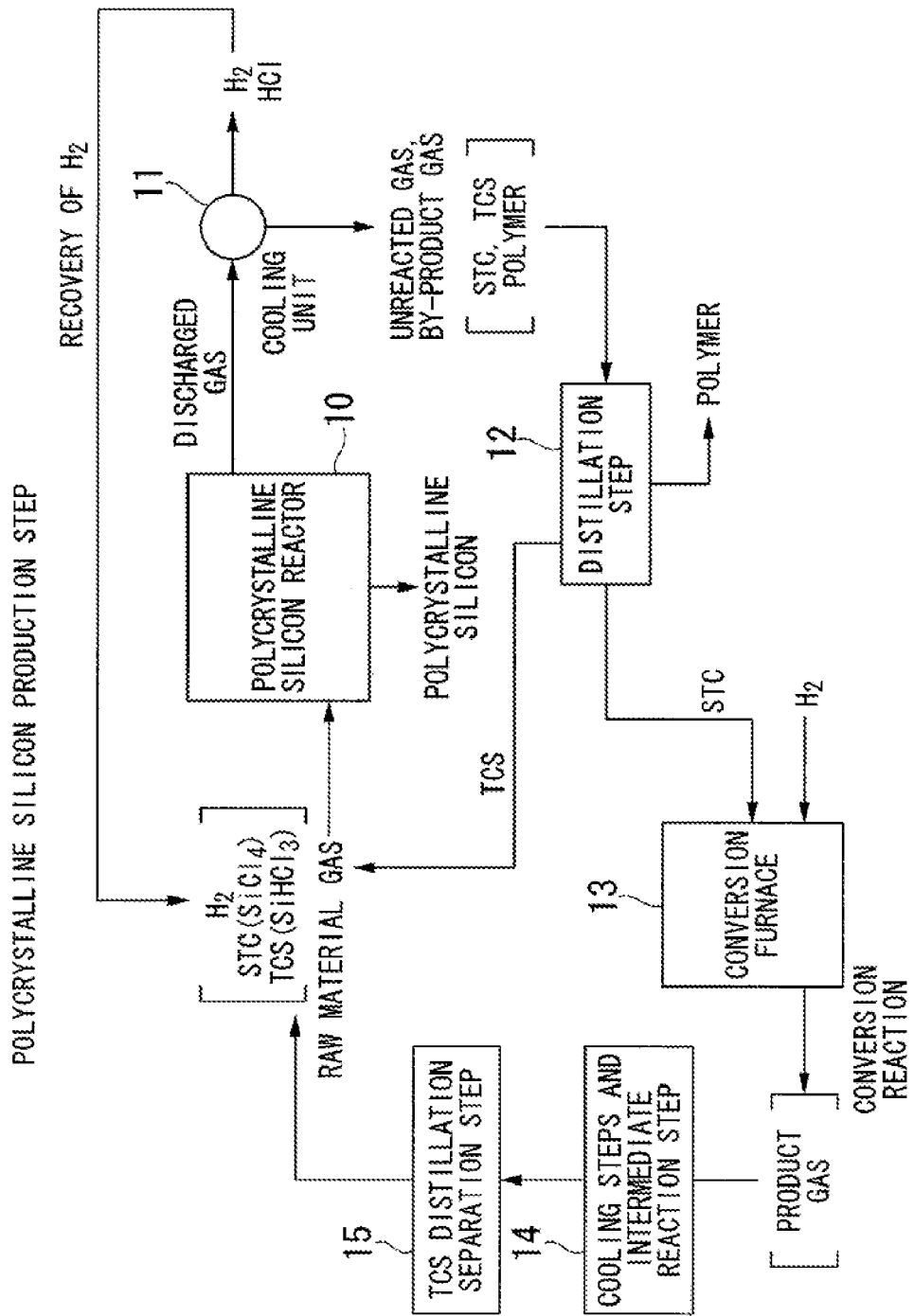
FIG. 1 is a production process diagram covering the production of polycrystalline silicon through to the conversion reaction.
Figure 7:
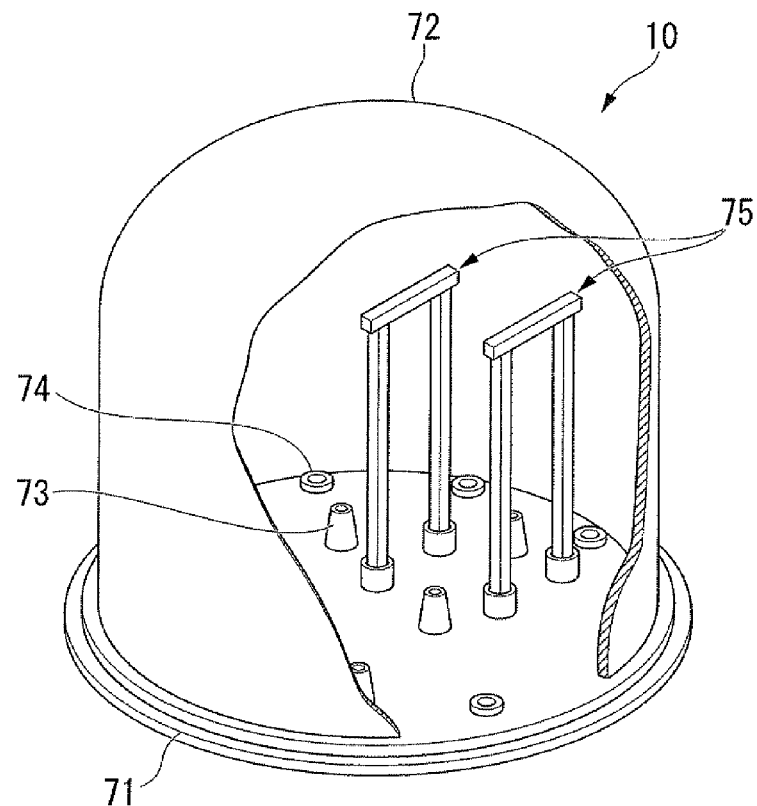
FIG. 7 is a schematic diagram of the polycrystalline silicon reactor.

The polycrystalline silicon producing step and the conversion reaction are shown in FIG. 1. In the polycrystalline silicon producing step shown in FIG. 1, a gas based on trichlorosilane (TCS), hydrogen, and silicon tetrachloride (STC), as raw material, is introduced into a polycrystalline silicon reactor 10. As shown in FIG. 7, the polycrystalline silicon reactor 10 is provided with a bottom plate 71 that constitutes the reactor bottom and a bell-shaped bell jar 72. The bottom plate 71 is provided with an inlet nozzle 73 that supplies the raw material gas, a gas outlet port 74 that discharges exhaust gas after the reaction, and a silicon seed rod assembly 75. When the raw material gas is brought into contact with the surface of the heated silicon seed rod assembly 75 (which is about 800° C. to 1200° C.), the raw material gas reacts according to the reactions (1) and (2) shown below. Silicon thus produced is deposited on the surface of the silicon seed rod assembly 75, and gradually grows into a polycrystalline silicon rod having a large diameter.

$$SiHCl_3 + H_2 \rightarrow Si + 3HCl \tag{1}$$

$$4SiHCl_3 \rightarrow Si + 3SiCl_4 + 2H_2 \tag{2}$$

(Discharged Gas Treatment Step)

The gas discharged from the polycrystalline silicon reactor 10 contains unreacted trichlorosilane (TCS) and hydrogen, as well as hydrogen chloride (HCl) produced as a by-product, and chlorosilanes such as silicon tetrachloride (STC), dichlorosilane and hexachlorodisilane. The discharged gas containing these chlorosilanes is led to a cooling unit 11 and is cooled to near −60° C. (for example, −65° C. to −55° C.) to be condensed and liquefied. In this stage, hydrogen that remains in a gas form without being liquefied is separated, goes through purification steps, and is supplied again to the polycrystalline silicon reactor 10 as a part of the raw material gas and reused.

The condensed liquid containing the chlorosilanes liquefied at the cooling unit 11 is introduced into a distillation step 12, and trichlorosilane (TCS) is separated by distillation. Recovered TCS is returned to the producing process for polycrystalline silicon and is reused.

Subsequently, silicon tetrachloride (STC) is separated by distillation. This silicon tetrachloride is introduced into the conversion furnace 13 together with hydrogen, and at a temperature of equal to or higher than 1000° C. and equal to or lower than 1900° C., trichlorosilane (TCS) is produced by a conversion reaction represented by the following formula (3).

$$SiCl_4 + H_2 \rightarrow SiHCl_3 + HCl \tag{3}$$

This reaction gas containing TCS goes through a step 14, comprising cooling steps and an intermediate reaction step, and is introduced into a TCS distillation separation step 15, where TCS is recovered. The recovered TCS is returned to the producing process for polycrystalline silicon, and is reused as a raw material for polycrystalline silicon.

(Reaction Gas Producing Step)

Figure 8:
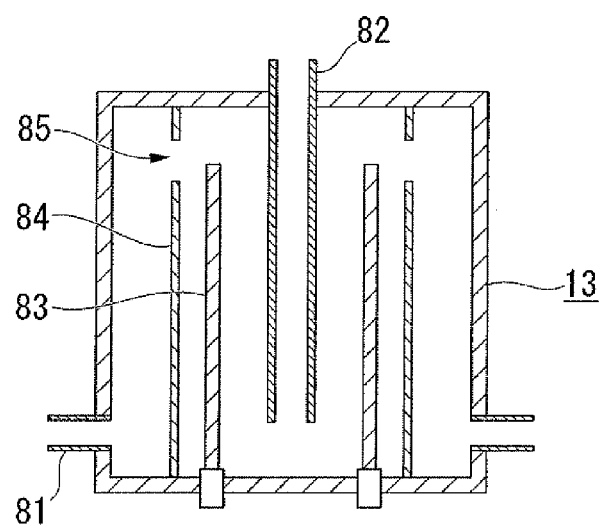
FIG. 8 is a cross-sectional diagram of the conversion furnace.

The supply gas (raw material gas) containing silicon tetrachloride and hydrogen of the present embodiment is introduced into the conversion furnace 13. FIG. 8 shows a cross-sectional diagram of the conversion furnace 13. For example, a cylindrical conversion furnace 13 is composed of a supply port 81 that is installed on the lower side wall surface and introduces the supply gas, an discharged pipe 82 that is installed at the center of the upper surface and discharges the reaction gas after the conversion reaction, a cylindrical heater 83 that is provided so as to surround the discharged pipe 82, and a cylindrical partition wall 84 that is provided so as to surround the heater 83. In the upper part of the partition wall 84, an opening 85 is provided along the circumference of the partition wall 84, and forms a flow path that leads the supply gas from the supply port 81 to the discharged pipe 82. The raw material silicon tetrachloride that is supplied may contain high-order chlorosilanes, or may have high-order chlorosilanes removed. However, as inconvenience occurs in that solids are deposited inside the conversion furnace during heating and clogs the flow path, it is preferable to remove high-order chlorosilanes. The conversion furnace 13 is heated to a temperature of equal to or higher than 1000° C. and equal to or lower than 1900° C., and the supplied raw material gas undergoes a conversion reaction. Thus, the reaction gas containing trichlorosilane, dichlorosilylene, hydrogen chloride and high-order silane compounds is produced.

The heater 83 is preferably coated with silicon carbide (SiC) in order to prevent corrosion.

When the heating temperature of the conversion furnace 13 is lower than 1000° C., there is a problem that the conversion ratio or the conversion rate is decreased, and the size of the apparatus increases. Furthermore, when the heating temperature of the conversion furnace 13 is higher than 1900° C., the conversion ratio is not improved, and the apparatus is uneconomical as a producing facility.

Figure 2:
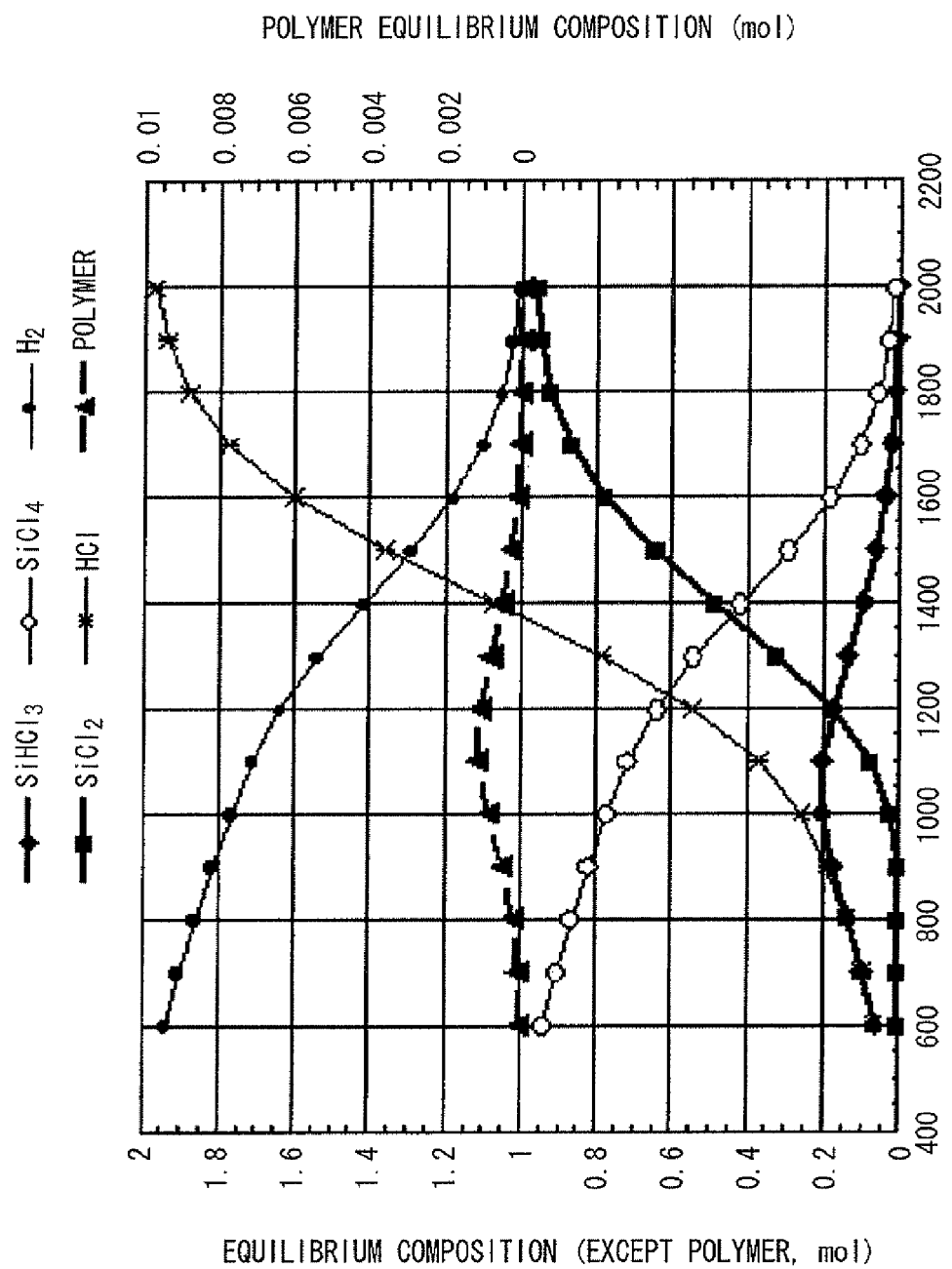
FIG. 2 is a graph showing the relationship between the reaction temperature and the product gas in the conversion reaction.

An example of the composition of the reaction product gas (equilibrium values) against the reaction temperature in the conversion reaction, is shown in FIG. 2. As shown in the diagram, the gas produced by the conversion reaction contains trichlorosilane, the target product, as well as unreacted $H_2$, $SiCl_4$, and by-products such as HCl, $SiCl_2$ and a polymer.

As shown in the graph of FIG. 2, since the conversion amount of $SiCl_4$ (amount of change in the reduction of $SiCl_4$) in the conversion reaction increases with the temperature, it is preferable that the reaction temperature of the conversion reaction is higher. Particularly, it is more preferable to set the reaction temperature to 1100° C. or higher, at which the conversion to $SiHCl_3$ is close to the maximum value, and the conversion to $SiCl_2$ is also significant. On the other hand, as the reaction temperature of the conversion reaction increases, the reaction rate of the decomposition of trichlorosilane (the reverse reaction of the reaction formula (3)) in the subsequent cooling step 1A, also increases. For this reason, when the reaction temperature of the conversion reaction is too high, the effect of suppressing the decomposition of trichlorosilane in the cooling step 1A is decreased. That is, even if a high conversion amount of $SiCl_4$ is obtained in the conversion reaction step, the conversion amount of $SiCl_4$ that is finally discharged after the cooling step 1A and the second cooling step should not be as large. Therefore, in order to obtain a high conversion amount of $SiCl_4$ after cooling by sufficiently exhibiting the effect of rapid cooling in the cooling step 1A, the reaction temperature of the initial conversion reaction is preferably 1300° C. or lower. As discussed above, the reaction temperature of the conversion reaction step is more preferably equal to or higher than 1100° C. and equal to or lower than 1300° C.

(Cooling Step)

Figure 3:
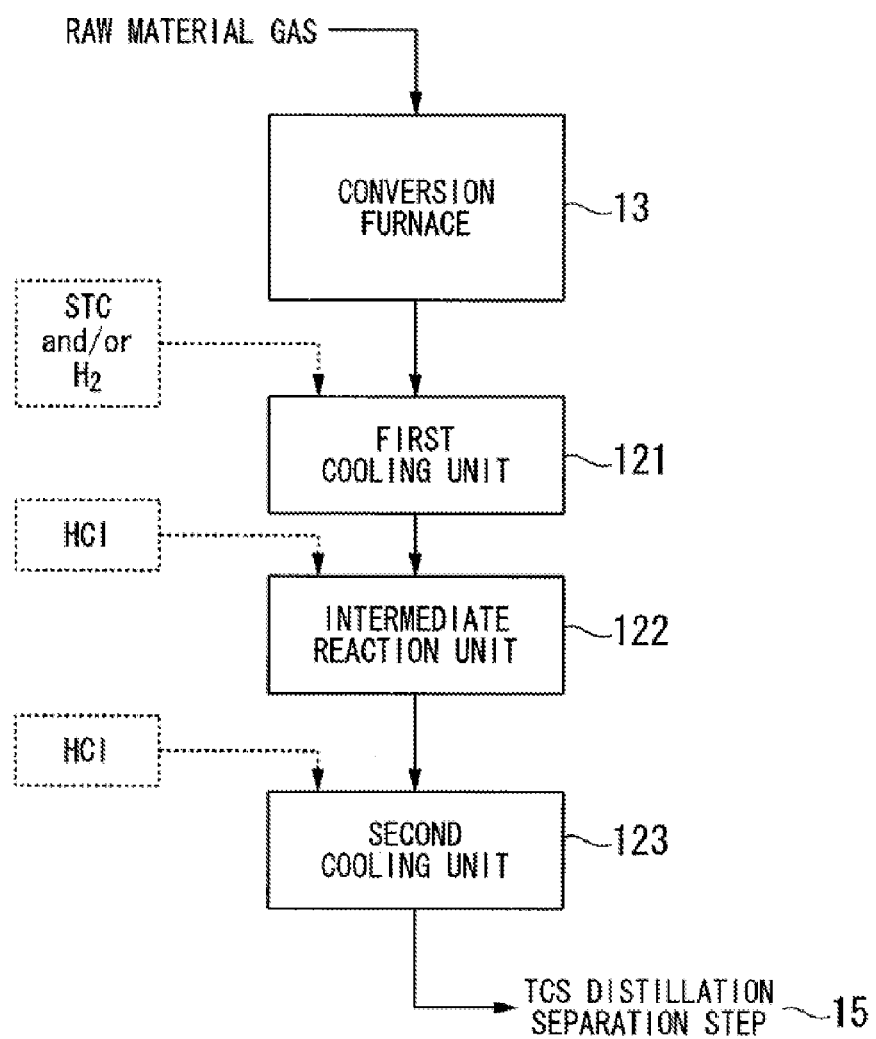
FIG. 3 is a conceptual diagram of the cooling process.
Figure 4:
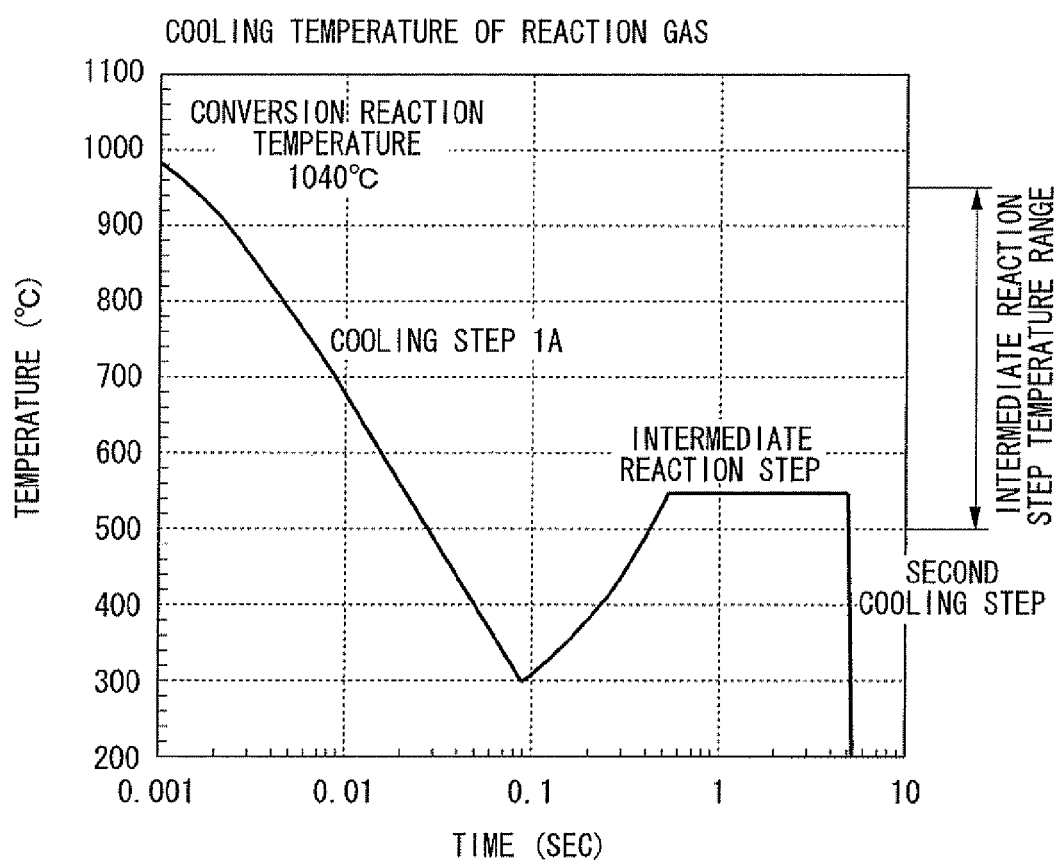
FIG. 4 is a graph showing an example of temperature changes in the first embodiment.

An example of the step 14, comprising cooling steps and an intermediate reaction step, is shown in FIG. 3, and changes of the cooling temperature of the reaction gas are shown in FIG. 4. As shown in the diagram, the reaction gas discharged from the conversion furnace 13 is introduced into a first cooling unit 121 where the cooling step 1A is carried out. In the first cooling unit 121, cooling is carried out to 600° C. or higher within 0.01 seconds from the initiation of cooling, and to 500° C. or lower within 2 seconds. The reaction gas discharged after the cooling step 1A is introduced into an intermediate cooling unit 122 where the intermediate reaction step is carried out, and is maintained in a temperature range of equal to or higher than 500° C. and equal to or lower than 950° C. for a time period of equal to or longer than 0.01 seconds and equal to or shorter than 5 seconds. Subsequently, the reaction gas discharged after the intermediate reaction step is introduced into a second cooling unit 123 where the second cooling step is carried out, and is cooled to below 500° C. The reaction gas is then sent to a TCS distillation separation step 15.

(Cooling Step 1A)

In the cooling step 1A, cooling is performed at a cooling rate which sufficiently suppresses the decomposition of trichlorosilane (the reverse reaction of the reaction formula (3)). Specifically, cooling is carried out to 600° C. or higher within 0.01 seconds from the initiation of cooling, and to 500° C. or lower within 2 seconds. Preferably, the reaction gas which has a temperature of 600° C. or higher for a time period of within 0.01 seconds from the initiation of cooling, is cooled to a temperature of equal to or higher than 100° C. and equal to or lower than 500° C. for a time period of equal to or longer than 0.01 seconds and equal to or shorter than 2 seconds. More preferably, the temperature for a time period of within 0.01 seconds from the initiation of cooling is lower by 50° C. or more than the reaction temperature during the conversion reaction, and is equal to or higher than 600° C. When cooling is performed under these conditions, the decomposition of trichlorosilane contained in the reaction gas (the reverse reaction of the formula (3)) can be sufficiently suppressed even on the scale of mass producing, the conditions do not represent excessive cooling conditions, and the producing the polymer can be suppressed to a small amount.

In the cooling step 1A, when the reaction gas is cooled to 600° C. or higher within 0.01 seconds from the initiation of cooling, and to 500° C. or lower within 2 seconds, the decomposition of trichlorosilane in the reaction gas and the producing the polymer is suppressed. The amount of the polymer generated as a result of the cooling rate described above (polymer producing ratio) is roughly equal to or greater than 0.1% and equal to or less than 2%. The polymer producing ratio (mol %-Si) is the proportion of silicon contained in the polymer produced, with respect to the raw material silicon tetrachloride ($SiCl_4$) (Si in the polymer/$SiCl_4$).

If the cooling rate is made higher than the conditions described above, that is, if the reaction gas is cooled to below 600° C. within a time period of less than 0.01 seconds from the initiation of cooling, the decomposition of trichlorosilane may be suppressed, but the polymer producing ratio tends to increase to about 2% to 3%, such that there is a tendency that the load in the intermediate reaction step increases. Specifically, since there is an increase in the reaction temperature or reaction time required to sufficiently decompose the polymer in the intermediate reaction step, the amount of heat required for heating increases, and the reaction vessel for the intermediate reaction step tends to increase in size. On the other hand, if the cooling rate of the first cooling is lower than the conditions described above, the decomposition of trichlorosilane in the reaction gas proceeds, and the recovery ratio of trichlorosilane decreases, which is not preferable.

The achieving cooling temperature of the cooling step 1A is suitably 500° C. or lower, and preferably equal to or higher than 100° C. and equal to or lower than 500° C., within 2 seconds. If the time taken to reach 500° C. or lower is longer than 2 seconds, the decomposition of trichlorosilane contained in the reaction gas proceeds. Furthermore, if the reaction gas is cooled to below 100° C., the chlorosilanes in the reaction gas may condense or be deposited in the apparatus, which is not preferable. When the achieving cooling temperature is 100° C. or higher, this condensation or precipitation does not easily occur and handling of the reaction gas can be achieved in a gas state. In addition, when a portion of the reaction gas has condensed during the cooling step 1A, in order to introduce this into the intermediate reaction step, it is preferable to supply the reaction gas after preheating and evaporating the condensed portion of the reaction gas.

The cooling time during the cooling step 1A is calculated as follows.

First, in the first cooling unit 121, the inlet gas temperature ti (K), the outlet gas temperature to (K), the temperature t1, t2, ... (K) of at least one site inside the first cooling unit 121, and the gas flow rate w (kg/s) are measured. At this time, the temperature t1 (K) inside the first cooling unit 121 is measured at a site where the temperature is in the range of equal to or higher than 573 K and equal to or lower than 773 K (equal to or higher than 300° C. and equal to or lower than 500° C.). Specification of this site can be predicted by calculation from the operation conditions or the design values, but if a plurality of measurement holes is installed at a predetermined interval in a structure in a state which would not cause any gas leak, a more suitable position may be specified. When plural temperatures are measured at the first cooling unit 121, a temperature that is equal to or higher than 573 K and equal to or lower than 773 K and is closest to 773 K (500° C.), is designated as t1.

Subsequently, the volume V ($m^3$) extending from the gas supply port 214 of the first cooling unit 121 to the site where the temperature t1 is measured, is measured or calculated.

The time τ (s) required for cooling from the inlet gas temperature ti (K) to the temperature t1 (K) inside the first cooling unit 121, is calculated by the following formula (1).

$$\tau = V/Fa = V\rho a/w \quad (1)$$

(ρa: Arithmetic average value of the reaction gas density ($kg/m^3$) calculated using the composition of the supply gas, with respect to the inlet gas temperature ti and the temperature t1 inside the first cooling unit 121; and Fa: Average volumetric flow rate ($m^3/s$))

For the cooling step 1A, the time required for cooling from the inlet gas temperature ti to a temperature t ($\geq 773\,K \geq t1$) (retention time), θ (s), is calculated by the following formula (2).

$$\theta = a/t + b \quad (2)$$

(in the formula (2), $a = \tau\{ti \times t1 \div (ti-t1)\}$, $b = -\tau\{t1 \div (ti-t1)\}$)

When the temperature t1 inside the first cooling unit 121 is equal to or higher than 573 K and equal to or lower than 773 K (equal to or higher than 300° C. and equal to or lower than 500° C.), the temperature of the fluid (reaction gas) containing chlorosilanes or hydrogen chloride can be measured with a thermocouple covered with a sheath tube, stainless steel, or a nickel alloy.

(Intermediate Reaction Step)

The reaction gas discharged after the first cooling is introduced into the intermediate cooling unit 122 where the intermediate reaction step is carried out, and is maintained in the temperature range of equal to or higher than 500° C. and equal to or lower than 950° C., preferably equal to or higher than 550° C. and equal to or lower than 800° C., and in view of energy cost, more preferably equal to or higher than 550° C. and equal to or lower than 600° C., for a time period of equal to or longer than 0.01 seconds and equal to or shorter than 5 seconds. When the reaction gas after the first cooling is maintained in the temperature range mentioned above, the polymer produced during the first cooling can be decomposed, while suppressing the decomposition of trichlorosilane. The time required to reach the temperature of the intermediate reaction step from the cooling step 1A is not particularly limited, but for a temperature increase to a temperature appropriate for the intermediate reaction step, the time required is preferably roughly equal to or longer than 0.01 seconds and equal to or shorter than 3 seconds.

In the intermediate reaction step, it is preferable to raise the temperature of the reaction gas discharged after the first cooling, to a temperature equal to or more than 100° C. plus the outlet gas temperature of the first cooling unit 121. The range of temperature increase for the reaction gas during the intermediate reaction step is more preferably equal to or greater than 100° C. and equal to or less than 500° C.

As shown in FIG. 4, for example, first, during the cooling step 1A, the reaction gas is cooled to a temperature of 600° C. or higher within 0.01 seconds from the initiation of cooling, and to a temperature of equal to or higher than 100° C. and equal to or lower than 500° C. within 2 seconds (in FIG. 4, the achieving cooling temperature is 300° C.). Thereafter, during the intermediate reaction step, when the temperature is slightly increased and maintained in the temperature range of equal to or higher than 550° C. and equal to or lower than 800° C. (in FIG. 4, 550° C.), the decomposition reaction of the polymer produced in the cooling step 1A can be made to proceed. Furthermore, in this temperature range, the decomposition of trichlorosilane is suppressed, and therefore, the amount of trichlorosilane does not substantially decrease.

Furthermore, while the cooling step 1A is a rapid cooling process carried out in a short time from the conversion reaction temperature of 1000° C. or higher, the cooling from the intermediate reaction step does not require a severe cooling rate such as in the cooling step 1A, and the cooling temperature is easily controlled.

When the retention temperature of the intermediate reaction step is below 500° C., the decomposition reaction of the polymer is very slow, and the produced polymer cannot be reduced. On the other hand, when this temperature exceeds 950° C., the reaction rate of decomposition of trichlorosilane increases, and the trichlorosilane content in the reaction gas is reduced. Furthermore, when the retention temperature exceeds 950° C., the amount of dichlorosilylene (SiCl$_2$) that produces the polymer increases, and therefore, the polymer is produced again during the second cooling. Furthermore, when the retention temperature of the intermediate reaction step surpasses 950° C., the amount of heat required to heat the system to this temperature increases, and this is uneconomical.

In the intermediate reaction step, the time required to maintain the reaction gas in the temperature range described above is equal to or longer than 0.01 seconds and equal to or shorter than 5 seconds. If this retention time is less than 0.01 seconds, the decomposition of the polymer is not sufficiently performed, and even if the retention time is longer than 5 seconds, the amount of the polymer decomposed does not change, but rather large-sized apparatuses are required, which is uneconomical.

A preferable temperature range for the intermediate reaction step is from 550° C. to 800° C. In this temperature range, since the decomposition reaction of the polymer proceeds for about 0.02 seconds to about 3 seconds, the facilities of the intermediate reaction step may be relatively small, and also, the temperature or the reaction time can be easily controlled.

During the intermediate reaction step, when the reaction gas discharged after the first cooling is maintained in the temperature range described above for the time period described above, the polymer produced in the cooling step 1A reacts with hydrogen chloride in the reaction gas and is decomposed into trichlorosilane or silicon tetrachloride. Therefore, the amount of the polymer can be reduced by the intermediate reaction step. The formulas of this decomposition reaction of the polymer are represented by the following formulas (5) to (8).

$$Si_2Cl_6 + HCl \rightarrow SiCl_4 + SiHCl_3 \quad (5)$$

$$Si_2HCl_5 + HCl \rightarrow 2SiHCl_3 \quad (6)$$

$$Si_2H_2Cl_4 + HCl \rightarrow SiHCl_3 + SiH_2Cl_2 \quad (7)$$

$$Si_3Cl_8 + 2HCl \rightarrow SiCl_4 + 2SiHCl_3 \quad (8)$$

As shown in the present embodiment, when the temperature of the reaction gas is rapidly lowered in the cooling step 1A, and then the polymer produced by the temperature decrease is decomposed in the intermediate reaction step, the temperature can be easily managed within the range of temperature at which the production of the polymer can be prevented.

(Second Cooling Step)

The reaction gas discharged after the intermediate reaction step is introduced into the second cooling unit 123 where the second cooling step is carried out, and is cooled again to below 500° C. Subsequently, the reaction gas is sent to a TCS distillation separation step 15.

The cooling rate of the second cooling step is not particularly limited, and cooling can be performed at a rate slower than that of the cooling step 1A. For example, the cooling rate of the second cooling step is preferably in the range of equal to or greater than 100° C./second and equal to or less than 10000° C./second, and more preferably equal to or greater than 500° C./second and equal to or less than 5000° C./second. The cooling temperature in the second cooling step is not particularly limited as long as the temperature is lower than 500° C., but in order to separate chlorosilanes including trichlorosilane, which is the target product, from the fluid through liquefaction, the reaction gas can be cooled finally to the range of, for example, equal to or lower than 20° C. and equal to or higher than −70° C. and separated from non-condensed gases (H$_2$, hydrogen chloride, and the like), and then a liquid containing trichlorosilane can be supplied to the distillation separation step.

(Introduction of Gas)

In the cooling step 1A, at least one of silicon tetrachloride (SiCl$_4$) and hydrogen may be introduced into the first cooling unit 121. When the SiCl$_4$ concentration and the H$_2$ concentration in the reaction gas is increased in the cooling step 1A, the production of trichlorosilane can be accelerated during the early stage of cooling, and the decomposition of trichlorosilane can be suppressed.

The amounts of SiCl$_4$ and H$_2$ introduced into the cooling step 1A are all preferably in the range of equal to or greater than 0.01 and equal to or less than 10 in terms of molar ratio, while the molar amount of SiCl$_4$ supplied to the conversion reaction is taken as 1. If the molar ratio of the amount introduced is less than 0.01, the amount of increase of trichlorosilane based on the introduction is small, and even if the compounds are supplied at a molar ratio exceeding 10, there is no significant change in the amount of increase of trichlorosilane, and the amounts is uneconomical.

During the intermediate reaction step, when hydrogen chloride is introduced into the intermediate cooling unit 122, the producing of trichlorosilane due to the decomposition of the polymer can be further promoted. The amount of hydrogen chloride to be introduced is preferably in the range of equal to or greater than 0.01 and equal to or less than 10 in terms of molar ratio, while the molar amount of $SiCl_4$ supplied to the conversion reaction is taken as 1. If the molar ratio of the amount introduced is less than 0.01, the effect of the introduction on the decomposition reaction of the polymer is small, and even if the compounds are supplied at a molar ratio exceeding 10, the effect on the decomposition reaction does not increase, and the amounts is uneconomical.

During the second cooling step, when hydrogen chloride is mixed with the reaction gas in a temperature region of 350° C. or higher, the reaction between hydrogen chloride and the polymer is promoted, the polymer remaining in a small amount is consumed, and at the same time, trichlorosilane which is one of the decomposition products is produced, so that the recovery ratio of trichlorosilane can be increased.

(Apparatus)

Figure 9:
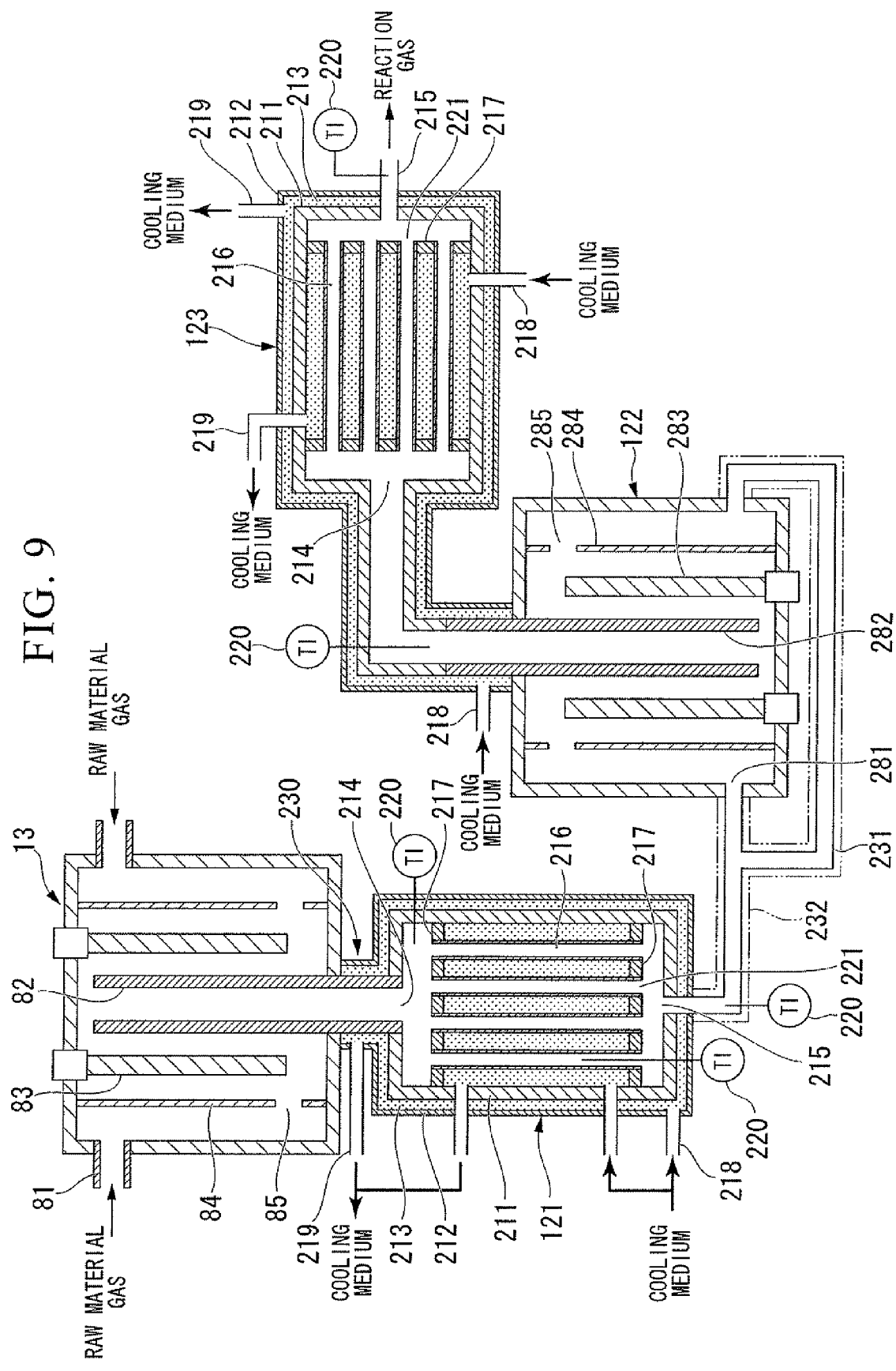
FIG. 9 is a cross-sectional diagram of the conversion furnace, first cooling unit, intermediate cooling unit, and second cooling unit used in the present embodiment.
Figure 10:
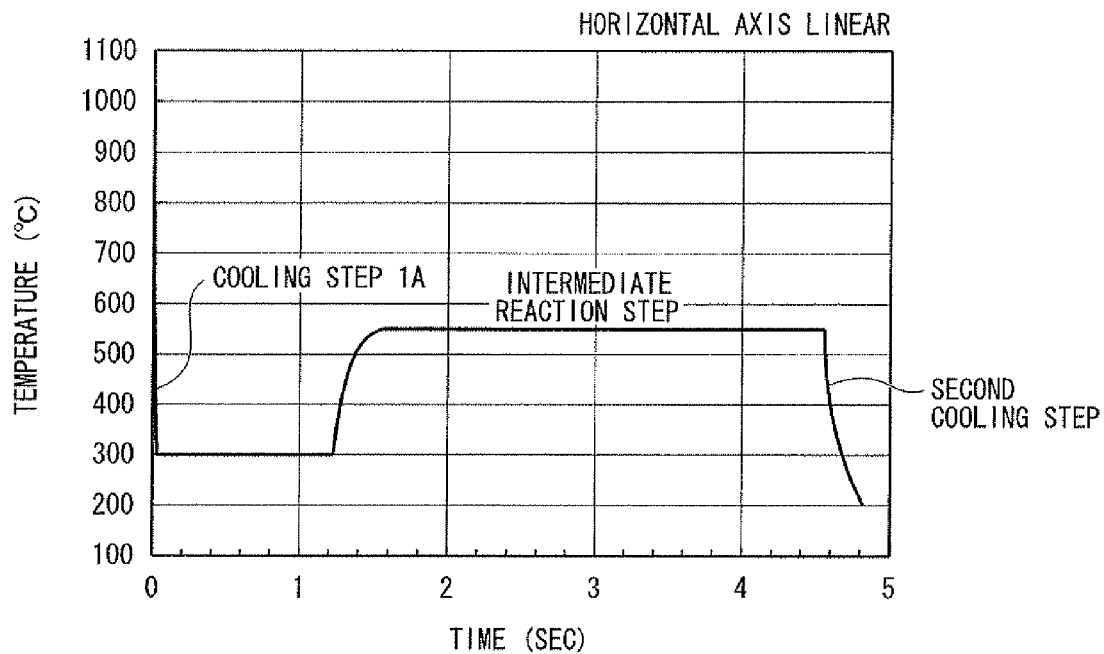
FIG. 10 is a graph showing temperature changes in Example A1 (the horizontal axis represents actual time).
Figure 11:
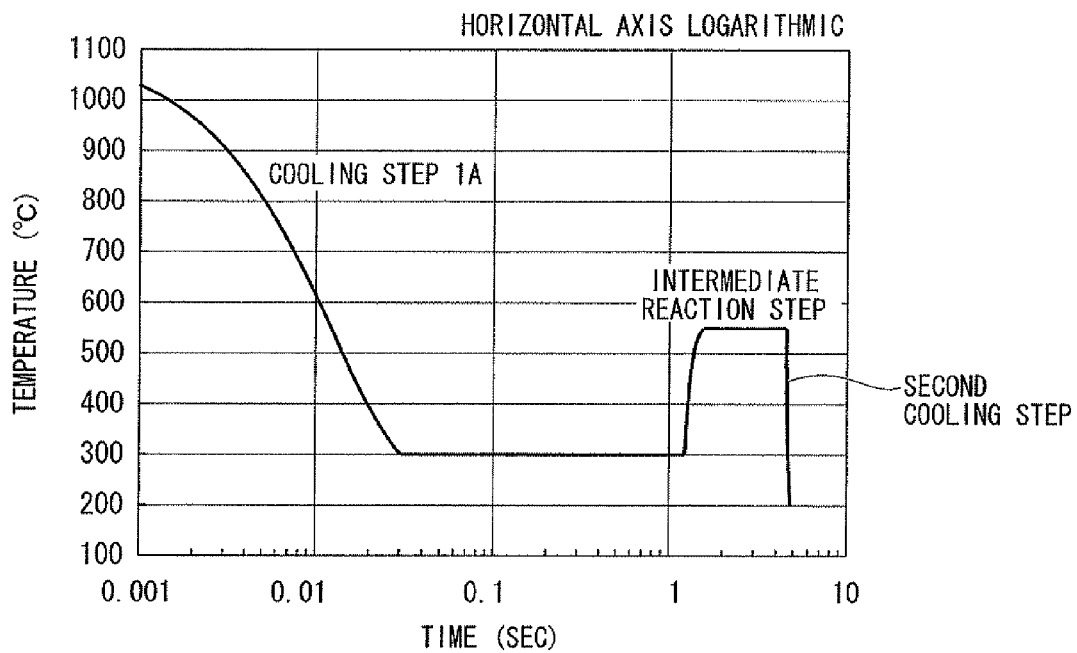
FIG. 11 is a graph showing temperature changes in Example A1 (the horizontal axis represents a logarithm).
Figure 12:
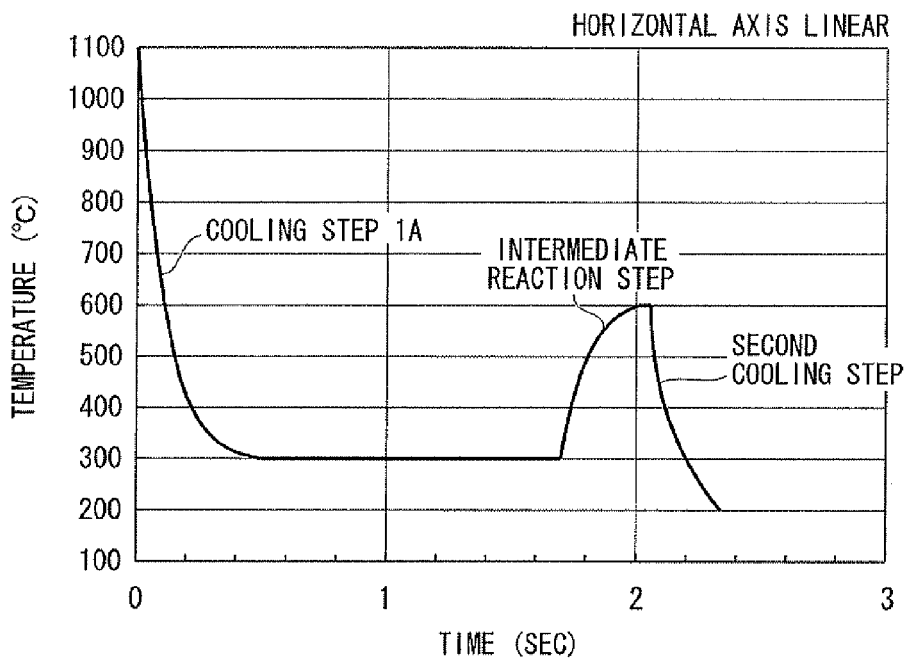
FIG. 12 is a graph showing temperature changes in Example A14 (the horizontal axis represents actual time).
Figure 13:
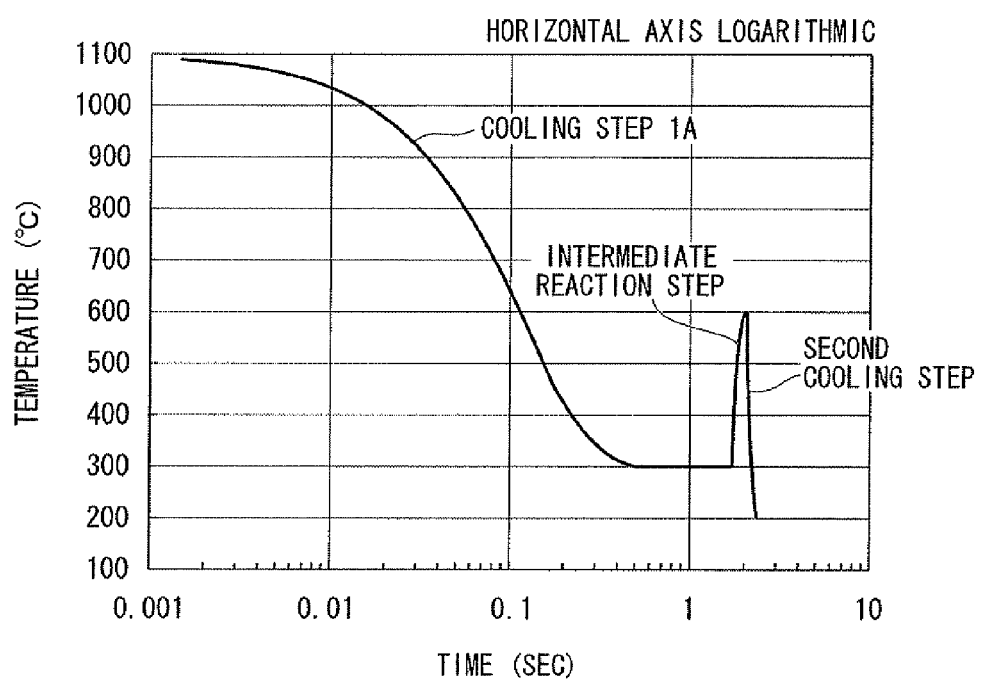
FIG. 13 is a graph showing temperature changes in Example A14 (the horizontal axis represents a logarithm).

FIG. 9 shows a vertical cross-sectional diagram of the conversion furnace 13 in which the reaction gas producing step is carried out, the first cooling unit 121 in which the cooling step 1A is carried out, the intermediate cooling unit 122 in which the intermediate reaction step is carried out, and the second cooling unit 123 in which the second cooling step is carried out.

The cylindrical conversion furnace 13 has the same configuration as the conversion furnace 13 of FIG. 8 described previously, except that a supply port 81 that introduces the supply gas (raw material gas) is installed on the upper side wall surface, and a discharged pipe 82 that discharges the reaction gas is installed at the center of the bottom surface. The constituent members having the same functions as those of the conversion furnace 13 of FIG. 8 are assigned with the same symbols as those used for the conversion furnace 13 of FIG. 8, and a detailed explanation thereof will not be repeated.

(First Cooling Unit)

As the cylindrical first cooling unit 121 used in the present embodiment, a cooling unit having a double-walled structure is used, and the space between the inner wall 211 and the jacket 212 is used as a cooling medium flow path 213. The first cooling unit 121 has a gas supply port 214 that introduces the discharged gas from the conversion furnace 13, a gas discharge port 215 that discharges cooled gas, a plurality of gas pipes 216, two sheets of disk-shaped gas pipe plates 217 each having multiple holes connected to the gas pipes 216, a cooling medium supply port 218 that supplies the cooling medium to the first cooling unit 121, a cooling medium discharge port 219 that discharges the cooling medium from the first cooling unit 121, and a thermometer 220.

The gas supply port 214 is installed at the center of the top surface of the first cooling unit 121, and the gas discharge port 215 is provided at the center of the bottom surface of the first cooling unit 121. The disk-shaped gas pipe plates 217 are respectively installed at the upper end and the lower end of the first cooling unit 121 so as to be in close contact with the inner wall 211 of the first cooling unit 121. The gas pipe plates 217 have a plurality of openings 221. The gas pipes 216 are connected in communication between the openings 221 of the respective gas pipe plates 217 that are installed at the upper end and the lower end of the first cooling unit 121, and a plurality of gas pipes 216 are vertically installed inside the first cooling unit 121.

In the first cooling unit 121, the cooling medium introduced from the cooling medium supply port 218 passes through the cooling medium flow path 213 and the external side of the gas pipes 216 inside the first cooling unit 121 (gaps between a gas pipe 216 and another gas pipe 216), and then is discharged through the cooling medium discharge port 219.

In the first cooling unit 121, it is preferable that a liquid such as cooling water or a heat medium oil is supplied as the cooling medium. Therefore, the cooling medium discharge port 219 is preferably installed at the top portion of the cooling medium flow path 213 and the flow path for the cooling medium outside the gas pipes 216, so that a gas pool which interrupts cooling within the cooling medium flow path is prevented, and the cooling medium supply port 218 is preferably connected to the lowermost portion on the opposite side.

According to the present embodiment, in order to rapidly cool the reaction gas discharged from the conversion furnace 13, the discharged pipe 82 of the conversion furnace 13 and the gas supply port 214 of the first cooling unit are directly linked. Furthermore, the jacket 212 of the first cooling unit 121 has a double-pipe structure which covers the joint portion 230 between the discharged pipe 82 of the conversion furnace 13 and the supply port 214 of the first cooling unit, and has a configuration in which the cooling medium circulates the external side of the joint portion 230.

The thermometer 220 used in the present embodiment may be a thermometer capable of measuring the inside of the apparatus in a non-contact manner, or may be a thermometer installed inside the apparatus. However, since corrosive gases flow through the inside of the apparatus, in the case of installing the thermometer 220 at a site with high temperature such as 600° C. or higher inside the apparatus, a sheath tube (sleeve) made of carbon or SiC-coated carbon may be inserted inside the apparatus, and the thermometer may be inserted therein for measure.

When a liquid such as water or oil is used as the cooling medium, the cooling efficiency is improved. According to the present embodiment, rapid cooling of the reaction gas may be carried out using hot water or a heat medium oil, which is preferably 50° C. or higher, and more preferably equal to or higher than 90° C. and equal to or lower than 300° C. as the cooling medium. Furthermore, it is preferable that hot water or pressurized water at a temperature close to the boiling point, is used as the cooling medium, and the heat exchange between the reaction gas and such water is carried out at the first cooling unit 121. According to this heat exchange, when the reaction gas is rapidly cooled, such water is converted into water vapor, and heat recovery can be carried out.

Since the reaction gas supplied to the first cooling unit 121 contains chlorosilanes or hydrogen chloride exhibiting corrosiveness, the first cooling unit 121 is formed of a corrosion resistant material (stainless steel, nickel, nickel alloys, carbon, and the like). Particularly, since chlorosilanes or hydrogen chloride exhibit high corrosiveness under high temperature, for a member which is brought into direct contact with the high temperature reaction gas discharged from the conversion furnace 13 and attains a high temperature of higher than 600° C., it is preferable to use carbon or SiC-coated carbon, which exhibits corrosion resistance at a high temperature.

On the other hand, according to the present embodiment, since rapid cooling is carried out at the first cooling unit 121, apparatuses following the first cooling unit 121 can be constructed with inexpensive materials such as stainless steel.

(Method for Controlling First Cooling Unit)

In order to perform the rapid cooling shown for the cooling step 1A, using the first cooling unit 121, the relationship between the heat transfer area A ($m^2$) (area in which the cooling medium and the reaction gas achieve heat exchange), and the volume V ($m^3$) of the portion of the first cooling unit 121 through which the reaction gas passes, may be set such that the ratio V/A is equal to or greater than 0.002 (m) and equal to or less than 0.2 (m), and more preferably the ratio V/A is equal to or greater than 0.004 (m) and equal to or less than 0.1 (m).

When the V/A value is larger than the range described above, the volume V of the first cooling unit 121 with respect to the heat transfer area A required for cooling is increased. Thus, the cooling rate is decreased, and there is a tendency that the decomposition of trichlorosilane proceeds in the cooling step 1A. On the other hand, when the V/A value is smaller than the range described above, the cooling rate is increased, but since the gas flow path is narrowed, the pressure drop inside the apparatus is increased. Furthermore, there are problems such as that process of making fine flow paths is complicated, and that clogging of the flow paths by solids is prone to occur.

In the case of using a heat medium oil as the cooling medium, since heat medium oils have low heat transfer coefficients and rapid cooling thereof is difficult, the cooling step 1A may be controlled by setting a smaller value for the ratio V/A.

According to the present embodiment, since a multi-tube type cooling unit such as described above is used as the first cooling unit 121 and a liquid is used as the cooling medium, rapid cooling can be realized.

(Intermediate Cooling Unit)

The cylindrical intermediate cooling unit 122 (intermediate reactor) is composed of a gas supply port 281 that introduces the cooled gas discharged from the first cooling unit 121, a gas discharged pipe 282 that discharges the gas which has been through the intermediate reaction step, a cylindrical heater 283 that is provided so as to surround the discharged pipe, and a cylindrical partition wall 284 that is provided so as to surround the heater 283. The gas supply port 281 is installed on the lower side wall surface of the intermediate cooling unit 122, and the gas discharged pipe 282 is installed such that the gas discharged pipe extends vertically from the center of the top surface toward the bottom surface of the intermediate cooling unit 122. In addition, a space for the gas to pass through is provided between the bottom surface of the intermediate cooling unit 122 and the lower end portion of the gas discharged pipe 282. In the upper portion of the partition wall 284, an opening 285 is provided along the circumference of the partition wall 284, and forms a flow path that leads the gas from the supply port 281 to the discharged pipe 282.

The gas discharge port 215 of the first cooling unit 121 and the gas supply port 281 of the intermediate cooling unit 122 are connected by a gas pipe 231 which is made of stainless steel or the like and has corrosion resistance. The gas pipe 231 has a double-pipe structure in which the gas pipe is surrounded by a heat-retaining pipe 232, and a heat medium or the like can be passed through the space between the heat-retaining pipe 232 and the gas pipe 231. Based on such a configuration of the gas pipe 231, the temperature inside the gas pipe can be maintained at a temperature of preferably equal to or higher than 50° C., and more preferably equal to or higher than 90° C., and equal to or lower than 300° C., and deposition of the polymer on the inner wall of the gas pipe 231 may be thus prevented. The gas pipe 231 may be covered with a heat insulating material or a heat-retaining material, and it is preferable to maintain the exit temperature of the reaction gas in the first cooling unit.

(Second Cooling Unit)

As the cylindrical second cooling unit 123, a cooling unit having a double-walled structure is used as in the case of the first cooling unit 121, and the space between the inner wall 211 and the jacket 212 is used as a cooling medium flow path 213. The second cooling unit 123 is provided with a gas supply port 214 that introduces the discharged gas from the intermediate cooling unit 122, a gas discharge port 215 that discharges the cooled gas, a plurality of gas pipes 216, two sheets of disk-shaped gas pipe plates 217 each having openings 221, a cooling medium supply port 218 that supplies the cooling medium to the second cooling unit 123, a cooling medium discharge port 219 that discharges the cooling medium from the second cooling unit 123, and a thermometer 220.

The second cooling unit 123 has the same configuration as that of the first cooling unit 121 as previously described, except that the second cooling unit 123 has a configuration in which the first cooling unit 121 is toppled sideways, so that when the reaction gas discharged after cooling is condensed, the condensed reaction gas is prevented from flowing back toward the gas supply port 214. The constituent members having the same functions as those of the first cooling unit 121 are assigned the same symbols as those used for the first cooling unit 121, and a detailed explanation thereof will not be repeated.

In addition, since it is also possible to make the cooling rate of the reaction gas milder in the second cooling step than in the first cooling step, the second cooling unit does not have to be identical to the first cooling unit, and a heat exchanger of a single-pipe type, a double-pipe type, a plate type, or the like can be used.

As the cooling medium that is used in the second cooling unit 123, a liquid such as water or oil, and a gas such as the raw material gas can be used. This is because rapid cooling such as that achieved in the first cooling unit 121 is not required in the second cooling unit 123. When the raw material gas is used as the cooling medium, thermal energy can be circulated within the apparatus. The temperature of the cooling medium supplied to the second cooling unit is preferably equal to or higher than −70° C. and equal to or lower than 500° C., and more preferably equal to or higher than −70° C. and equal to or lower than 300° C.

From the viewpoint of cooling efficiency, it is preferable to pass a liquid cooling medium through the cooling medium flow path 213 of the second cooling unit 123. On the other hand, in the case of using a gaseous cooling medium, it is preferable to pass the gas through the outside of the gas pipes 216 (gap between a gas pipe 216 and another gas pipe 216) inside the second cooling unit 123.

Figure 14:
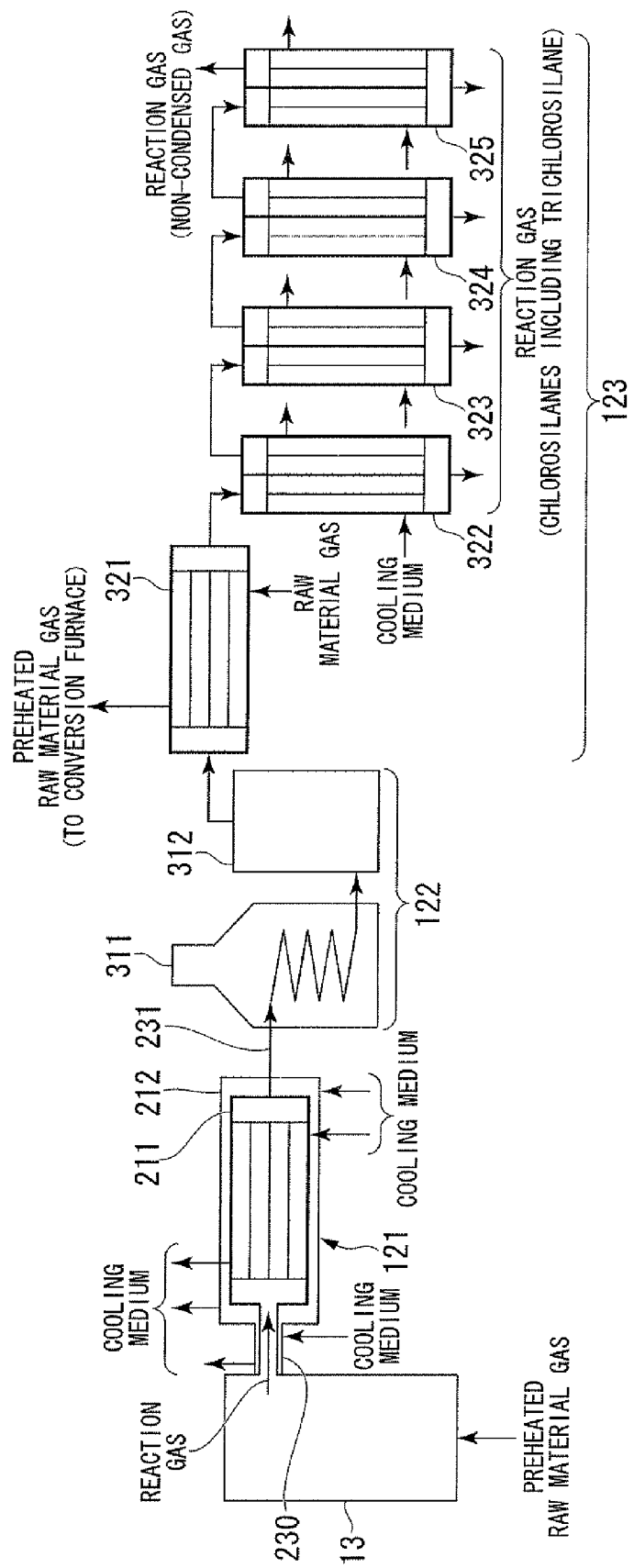
FIG. 14 is an exemplary layout diagram of the conversion furnace, the first cooling unit, the intermediate cooling unit, and the second cooling unit that can be used in the present embodiment.

Furthermore, the second cooling unit 123 is preferably composed of plural separate cooling units, so that the temperature of the cooling medium is changed to an appropriate range in accordance with the temperature of the reaction gas that decreases slowly. For example, as shown in FIG. 14, four cooling units are arranged to be connected in series, and the cooling medium is changed from the raw material gas to water, brine (antifreeze) and Freon (low temperature coolant), in this order from the side where the reaction gas temperature is higher. Based on such a configuration, the reaction gas is cooled finally to a temperature close to −70° C., and from the reaction gas chlorosilanes including trichlorosilane can be separated and recovered by being liquefied.

Second Embodiment

The method for producing trichlorosilane according to the second embodiment is characterized by having a cooling step 1B of cooling the reaction gas discharged from the conversion furnace same as described in the first embodiment to below 600° C. within 0.01 seconds; an intermediate reaction step of maintaining the reaction gas discharged after the cooling step 1B, in a temperature range of equal to or higher than 500° C. and equal to or lower than 950° C. for a time period of equal to or longer than 0.01 seconds and equal to or shorter than 5 seconds; and a second cooling step of cooling the reaction gas discharged after the intermediate reaction step, to below 500° C.

(Polycrystalline Silicon Producing Step)

The polycrystalline silicon producing step of the second embodiment is carried out in the same manner as in the polycrystalline silicon producing step of the first embodiment.

(Discharged Gas Treatment Step)

The gas that has been used in the polycrystalline silicon producing step and is discharged from the polycrystalline silicon reactor 10 contains unreacted trichlorosilane (TCS) and hydrogen, as well as hydrogen chloride (HCl) produced as a by-product, and chlorosilanes such as silicon tetrachloride (STC), dichlorosilane and hexachlorodisilane. The discharged gas containing these chlorosilanes is treated by the same method as in the discharged gas treatment step of the first embodiment.

(Reaction Gas Producing Step)

The supply gas containing raw material silicon tetrachloride, which has been obtained by distillation separation of the discharged gas in the discharged gas treatment step, and hydrogen are introduced into the conversion furnace 13, as in the reaction gas producing step of the first embodiment. The conversion furnace 13 is heated to a temperature of equal to or higher than 1000° C. and equal to or lower than 1900° C., and the supplied raw material gas undergoes a conversion reaction. Thus, a reaction gas containing trichlorosilane, dichlorosilylene, hydrogen chloride and high-order silane compounds is produced.

When the heating temperature of the conversion furnace 13 is lower than 1000° C., there is a problem that the conversion ratio or the conversion rate is decreased, and the size of the apparatus increases. Furthermore, when the heating temperature of the conversion furnace 13 is higher than 1900° C., the conversion ratio is not improved, and the apparatus is economically inefficient as a producing facility.

An example of the composition of the reaction product gas (equilibrium values) against the reaction temperature in the conversion reaction according to the second embodiment, is shown in FIG. 2 similarly to the first embodiment.

As shown in the graph of FIG. 2, since the conversion amount of $SiCl_4$ (amount of change in the reduction of $SiCl_4$) in the conversion reaction increases with the temperature, it is preferable that the reaction temperature of the conversion reaction is higher. Particularly, it is more preferable to set the reaction temperature to 1100° C. or higher, at which the conversion to $SiHCl_3$ is close to the maximum value, and the conversion to $SiCl_2$ is also significant. On the other hand, as the reaction temperature of the conversion reaction increases, the reaction rate of the decomposition of trichlorosilane (reverse reaction of the reaction formula (3)) at the subsequent cooling step 1B, also increases. For this reason, when the reaction temperature of the conversion reaction is too high, the effect of suppressing the decomposition of trichlorosilane at the cooling step 1B is decreased. That is, even if a high conversion amount of $SiCl_4$ is obtained in the conversion reaction step, the conversion amount of $SiCl_4$ that is finally discharged after the cooling step 1B and the second cooling step should not be so large. Therefore, in order to obtain a high conversion amount of $SiCl_4$ after cooling by sufficiently exhibiting the effect of rapid cooling at the cooling step 1B, the reaction temperature of the initial conversion reaction is preferably 1300° C. or lower. As discussed above, the reaction temperature of the conversion reaction step is more preferably equal to or higher than 1100° C. and equal to or lower than 1300° C.

(Cooling Step)

Figure 5:
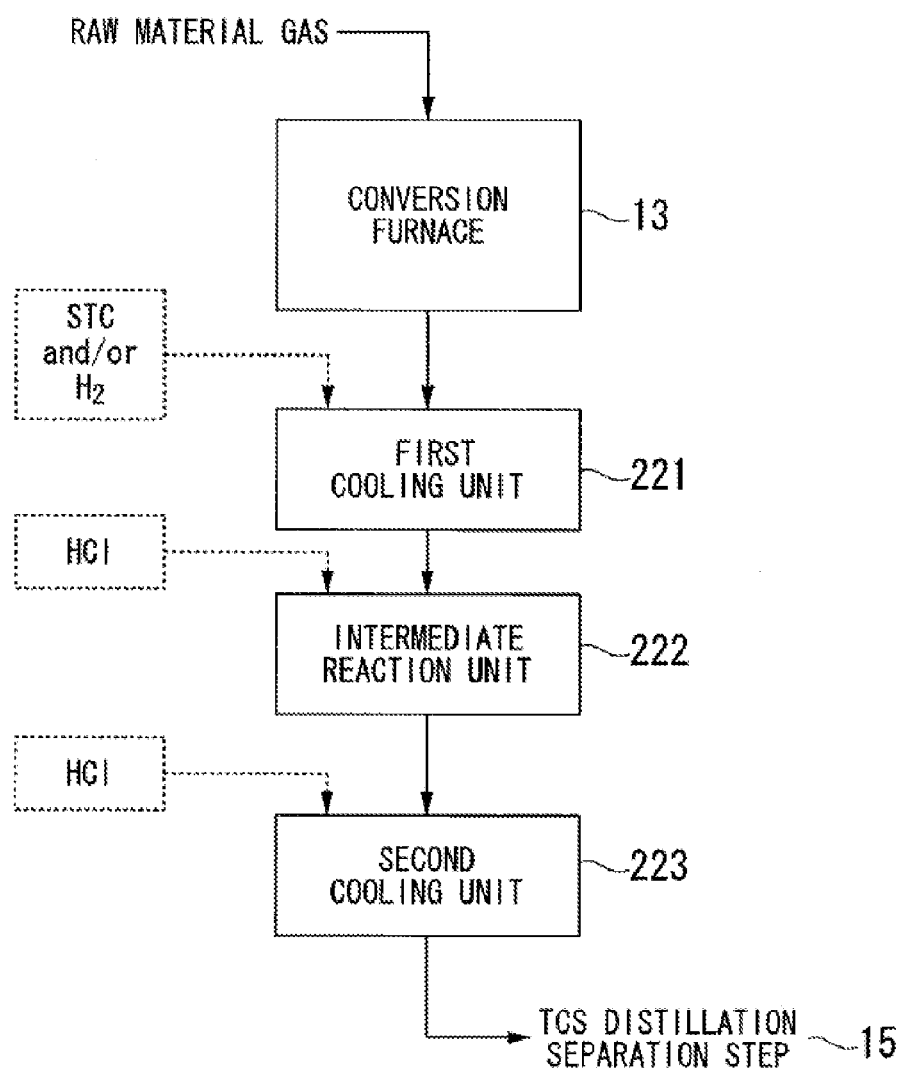
FIG. 5 is a conceptual diagram of the cooling process.
Figure 6:
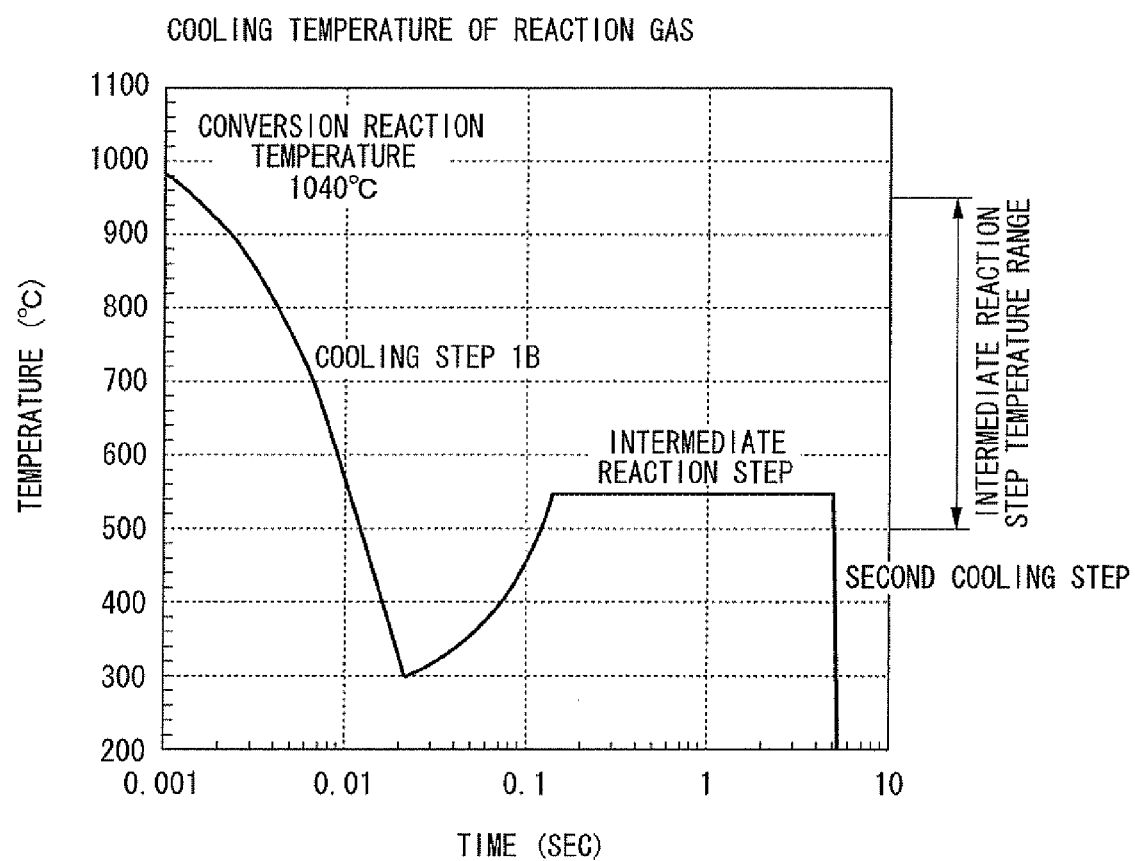
FIG. 6 is a graph showing an example of temperature changes in the second embodiment.

An example of the step 14, comprising cooling steps and an intermediate reaction step, is shown in FIG. 5, and changes of the cooling temperature of the reaction gas are shown in FIG. 6. As shown in the diagram, the reaction gas discharged from the conversion furnace 13 is introduced into a first cooling unit 221 where the cooling step 1B is carried out, and is cooled to below 600° C. within 0.01 seconds. The reaction gas discharged after the cooling step 1B is introduced into an intermediate cooling unit 222 where the intermediate reaction step is carried out, and is maintained in a temperature range of equal to or higher than 500° C. and equal to or lower than 950° C. for a time period of equal to or longer than 0.01 seconds and equal to or shorter than 5 seconds. Subsequently, the reaction gas discharged after the intermediate reaction step is introduced into a second cooling unit 223 where the second cooling step is carried out, and is cooled to below 500° C. The reaction gas is then sent to a TCS distillation separation step 15.

(Cooling Step 1B)

In the cooling step 1B, cooling is performed at a cooling rate which sufficiently suppresses the decomposition of trichlorosilane (reverse reaction of the reaction formula (3)). Specifically, cooling is carried out to a temperature below 600° C. within 0.01 seconds. At that time, preferably, the reaction gas is cooled such that the achieving cooling temperature is equal to or higher than 100° C. and equal to or lower than 500° C. When cooling is performed under these conditions, the decomposition of trichlorosilane contained in the reaction gas (reverse reaction of the formula (3)) can be suppressed even in the scale of mass producing. The polymer producing rate in the reaction gas in the cooling step 1B is approximately equal to or greater than 0.5% and equal to or less than 3%.

The achieving cooling temperature of the cooling step 1B is preferably 100° C. or higher. When the reaction gas is cooled to below 100° C., the chlorosilanes in the reaction gas may condense or deposit inside the apparatus, which is not preferable. When the achieving cooling temperature is 100° C. or higher, this condensation or precipitation does not easily occur and handling of the reaction gas can be achieved in a gas state. In addition, when a portion of the reaction gas has condensed during the cooling step 1B, in order to introduce this into the intermediate reaction step, it is preferable to supply the reaction gas after preheating the portion of the reaction gas to evaporate.

In the cooling step 1B, if the time required for cooling the reaction gas to below 600° C. is longer than 0.01 seconds, the decomposition of trichlorosilane contained in the reaction gas tends to proceed.

(Intermediate Reaction Step)

The reaction gas discharged after the cooling step 1B is introduced into the intermediate cooling unit 222 where the intermediate reaction step is carried out, and is maintained in a temperature range of equal to or higher than 500° C. and equal to or lower than 950° C., preferably equal to or higher than 550° C. and equal to or lower than 800° C., and in view of energy cost, more preferably equal to or higher than 550° C. and equal to or lower than 600° C., for a time period of equal to or longer than 0.01 seconds and equal to or shorter than 5 seconds. When the reaction gas discharged after the first cooling is maintained in the temperature range mentioned above, the polymer produced during the first cooling can be decomposed, while suppressing the decomposition of trichlorosilane. The time required to reach from the cooling step 1B to the temperature of the intermediate reaction step is not particularly limited, but for a temperature increase to a temperature appropriate for the intermediate reaction step, the time required is preferably approximately equal to or longer than 0.01 seconds and equal to or shorter than 3 seconds.

As shown in FIG. 6, for example, during the cooling step 1B, the reaction gas is cooled to a achieving cooling temperature of equal to or higher than 100° C. and equal to or lower than 500° C. (in FIG. 6, the achieving cooling temperature is 300° C.). Thereafter, during the intermediate reaction step, when the temperature is slightly increased and maintained in the temperature range of equal to or higher than 550° C. and equal to or lower than 800° C. (in FIG. 6, 550° C.), the decomposition reaction of the polymer produced in the cooling step 1B can be made to proceed. Furthermore, in this temperature range, the decomposition of trichlorosilane is suppressed, and therefore, the content of trichlorosilane does not substantially decrease.

Furthermore, while the cooling step 1B is a rapid cooling process carried out in a short time from the conversion reaction temperature of 1000° C. or higher, the cooling from the intermediate reaction step does not require a severe cooling rate such as in the cooling step 1B, and the cooling temperature is easily controlled.

When the retention temperature of the intermediate reaction step is below 500° C., the decomposition reaction of the polymer is very slow, and the produced polymer cannot be reduced. On the other hand, when this temperature exceeds 950° C., the reaction rate of decomposition of trichlorosilane increases, and the trichlorosilane content in the reaction gas is reduced. Furthermore, when the retention temperature exceeds 950° C., the amount of dichlorosilylene ($SiCl_2$) that produces the polymer increases, and therefore, the polymer is produced again during the second cooling. Furthermore, when the retention temperature of the intermediate reaction step surpasses 950° C., the amount of heat required to heat the system to this temperature increases, and this is uneconomical.

In the intermediate reaction step, the time required to maintain the reaction gas in the temperature range described above is equal to or longer than 0.01 seconds and equal to or shorter than 5 seconds. If this retention time is less than 0.01 seconds, the decomposition of the polymer is not sufficiently achieved, and even if the retention time is longer than 5 seconds, the amount of the polymer decomposed does not change, but rather large-sized apparatuses are required, which is economically inefficient.

A preferable temperature range for the intermediate reaction step is from 550° C. to 800° C. In this temperature range, since the decomposition reaction of the polymer occurs for about 0.02 seconds to about 4 seconds, the facilities of the intermediate reaction step may be relatively small, and also, the temperature or the reaction time can be easily controlled.

When the reaction gas discharged after the first cooling is maintained in the temperature range described above for the time period described above during the intermediate reaction step, the polymer produced in the cooling step 1B reacts with hydrogen chloride in the reaction gas and is decomposed into trichlorosilane or silicon tetrachloride, and therefore, the amount of the polymer can be reduced.

(Second Cooling Step)

The reaction gas discharged after the intermediate reaction step is introduced into the second cooling unit 223 where the second cooling step is carried out, and is cooled again to below 500° C. Subsequently, the reaction gas is sent to a TCS distillation separation step 15.

(Introduction of Gas)

In the cooling step 1B, at least one of silicon tetrachloride ($SiCl_4$) and hydrogen may be introduced into the first cooling unit 221. When the $SiCl_4$ concentration and the $H_2$ concentration in the reaction gas are increased at the cooling step 1B, the producing of trichlorosilane can be accelerated during the early stage of cooling, and the decomposition of trichlorosilane can be suppressed.

The amounts of $SiCl_4$ and $H_2$ introduced into the cooling step 1B are all preferably in the range of equal to or greater than 0.01 and equal to or less than 10 in terms of molar ratio, while the molar amount of $SiCl_4$ supplied to the conversion reaction is taken as 1. If the molar ratio of the amount introduced is less than 0.01, the amount of increase of trichlorosilane based on the introduction is small, and even if the compounds are supplied at a molar ratio exceeding 10, there is no significant change in the amount of increase of trichlorosilane, and it is economically inefficient.

During the intermediate reaction step, when hydrogen chloride is introduced into the intermediate cooling unit 222, the producing of trichlorosilane due to the decomposition of the polymer can be further promoted. The amount of hydrogen chloride to be introduced is preferably in the range of equal to or greater than 0.01 and equal to or less than 10 in terms of molar ratio, while the molar amount of $SiCl_4$ supplied to the conversion reaction is taken as 1. If the molar ratio of the amount introduced is less than 0.01, the effect of the introduction on the decomposition reaction of the polymer is small, and even if the compounds are supplied at a molar ratio exceeding 10, the effect on the decomposition reaction does not increase, and it is economically inefficient.

During the second cooling step, when hydrogen chloride is mixed with the reaction gas in a temperature region of 350° C. or higher, the reaction between hydrogen chloride and the polymer is promoted, the polymer remaining in a small amount is consumed, and at the same time, trichlorosilane which is one of the decomposition products is produced, so that the recovery ratio of trichlorosilane can be increased.

In the cooling step of the second embodiment, the same conversion furnace 13, first cooling unit 121, intermediate cooling unit 122 and second cooling unit 123 which are shown in FIG. 9 as those used in the first embodiment can be used. Therefore, an explanation of the apparatus will not be repeated.

In the first embodiment and the second embodiment which are embodiments of the present invention, for example, as shown in FIG. 14, an apparatus in which a conversion furnace 13, a first cooling unit 121, an intermediate cooling unit 122 and a second cooling unit 123 are arranged may be used. The reaction gas discharged from the upper portion of the conversion furnace 13 is sent to the first cooling unit 121 which is connected thereto through a short connection unit 230. When the connection unit 230 is made short, the reaction gas discharged from the conversion furnace 13 can be rapidly cooled at the first cooling unit 121, and the decomposition of trichlorosilane is suppressed. The reaction gas discharged from the first cooling unit 121 is sent to a temperature raising unit 311 of the intermediate cooling unit 122 that is connected through a short gas pipe 231. When the short gas pipe 231 is used, the exit temperature of the first cooling unit 121 can be maintained, and deposition of the polymer inside the gas pipe can be prevented. As such, in the present embodiment, it is particularly preferable to further shorten the length of the gas pipe that connects the first cooling unit 121 and the intermediate cooling unit 122. Furthermore, when the temperature at the intermediate cooling unit 122 is set to 600° C. or lower, an inexpensive metal such as stainless steel can be used as the apparatus material. In that case, the control of temperature or the control of retention time at the intermediate cooling unit can be easily achieved by constructing the intermediate cooling unit to be divided into a temperature raising unit 311 and a temperature retaining unit 312. In the temperature raising unit 311, the reaction gas discharged after the first cooling is preferably heated to a temperature of 100° C. or more plus the exit temperature of the first cooling unit 121, and for this purpose, a heating device of a tube type (external heating type) may be used. The temperature retaining unit 312 may be provided with a heat-insulating material in the outside, or may be provided with a heater for heat retaining purposes, in order to maintain the temperature of the reaction gas. The reaction gas that passes through the temperature raising unit 311 and the temperature retaining unit 312 of the intermediate cooling unit 122 is further sent to the second cooling unit 123. In the present embodiment, as it has been explained previously, it is preferable that the second cooling unit 123 is composed of plural cooling units 321 to 325, and cooling of the reaction gas is carried out in turn.

EXAMPLES

Examples according to the method of the first embodiment of the present invention will be shown together with Comparative Examples. These results are shown in Table 1. Furthermore, the conversion ratio (mol %-Si) to $SiHCl_3$ shown in Table 1 is the producing proportion of trichlorosilane to the raw material silicon tetrachloride ($SiCl_4$) ($SiHCl_3/SiCl_4$), and the polymer producing ratio (mol %-Si) is the proportion of silicon contained in the produced polymer with respect to the raw material silicon tetrachloride ($SiCl_4$) (Si in polymer/$SiCl_4$).

Examples A1 to A11

A mixed gas of hydrogen and silicon tetrachloride (molar ratio of $H_2$ and $SiCl_4$, $H_2/SiCl_4$=2.0) is used as a raw material, and the raw material gas is introduced into a conversion furnace and is allowed to react at 1100° C. The product gas discharged after the reaction is introduced into a first cooling unit, and is cooled to 300° C. The reaction gas temperature for a time period of 0.01 seconds from the initiation of cooling, the achieving cooling temperature and the time taken to reach the achieving cooling temperature are presented in Table 1. This reaction gas discharged after the cooling step 1A is introduced into an intermediate cooling unit, and the gas temperature is raised and maintained at the temperature indicated in Table 1 for the indicated time. The reaction gas discharged after the intermediate reaction step is introduced into a second cooling unit, and the gas temperature is lowered again to 200° C. within 0.3 seconds. The conversion ratio to trichlorosilane and the producing ratio of the polymer, which are contained in the reaction gas discharged after the cooling step 1A and after the second cooling step, are shown in Table 1.

The respective times for the first cooling step of Example A1 in the Table 1 are calculated as follows.

In Example A1, various temperatures are measured as follows: the inlet gas temperature of the first cooling unit, ti=1100° C. (1373 K), the outlet gas temperature of the first cooling unit, to=300° C. (573 K), and temperature at the measurement point A in the first cooling unit, t1=460° C. (733 K). The measurement point A is a site where the temperature in the first cooling unit is in the range of 300° C. to 500° C. (673 K to 873 K), and is determined by simulation. A plurality of measurement holes are provided in the first cooling unit such that the reaction gas does not leak to the outside, and the internal temperatures are measured at the plural sites. The measurement point A is one of the places selected among the plural sites.

The gas flow rate w is 0.02 (kg/s).

The volume V extending from the gas supply port of the first cooling unit to the measurement point A (measurement site for temperature t1) is 0.000206 $m^3$.

The time required for cooling from the temperature ti=1373 K to t1=733 K, τ (s), is calculated by the following formula (1).

$$\tau = V/Fa = V\rho a/w \qquad (1)$$

ρa: Arithmetic average of the reaction gas density at the inlet gas temperature ti and at temperature t1 at the measurement point A In Example A1, since the reaction gas density at inlet gas temperature ti is 1.063 kg/$m^3$, and the reaction gas density at temperature t1 at the measurement point A is 1.992 kg/$m^3$, ρa is 1.528 kg/$m^3$.

Therefore, the time required for cooling from the inlet gas temperature ti to temperature t1 at the measurement point A is calculated as τ=0.000206×1.528/0.020=0.0157 s.

On the other hand, the retention time θ at an intermediate temperature t in the range of from the inlet gas temperature ti to the temperature t1 at the measurement point A, is determined by the following formula (2).

$$\theta = a/t + b \qquad (2)$$

In this formula (2), $$a = \tau\{ti \times t1 \div (ti-t1)\} = 0.0157 \times \{1373 \times 733/(1373-733)\} = 24.69$$

$$b = -\tau\{t1 \div (ti-t1)\} = -0.0157 \times \{733/(1373-733)\} = -0.0180$$

Therefore,
the retention time to reach 600° C. (873 K) is $$\theta = a/t + b = 24.69/(600+273) - 0.0180 = 0.0103 \text{ s}.$$

The retention time to reach 500° C. (773 K) is $$\theta = 24.69/(500+273) - 0.0180 = 0.0139 \text{ s}$$

The retention time to reach 610° C. (883 K) is $$\theta = 24.69/(610+273) - 0.0180 = 0.0100 \text{ s}.$$

Therefore, Example A1 satisfies the conditions of the cooling step 1A of the first embodiment, that is, "the reaction gas is cooled to a temperature of 600° C. or higher within 0.01 seconds from the initiation of cooling, and to a temperature of 500° C. or lower within 2 seconds."

The same measurements and calculations are also carried out for the other Examples, and the results are presented in Table 1.

Examples A12 to A15

The conversion reaction is carried out under the same conditions as in Example A1, except that the cooling conditions for the cooling step 1A are set up as indicated in Table 1, and the product gas discharged after the reaction is introduced into the first cooling unit and is cooled. The reaction gas temperature for a time period of 0.01 seconds from the initiation of cooling, the achieving cooling temperature and the time taken to reach the achieving cooling temperature are presented in Table 1. This reaction gas discharged after the cooling step 1A is introduced into an intermediate cooling unit, and the gas temperature is raised and maintained at the temperature indicated in Table 1 for the indicated time. The reaction gas discharged after the intermediate reaction step is introduced into a second cooling unit, and the gas temperature is decreased again to cool the reaction gas to 200° C. within 0.3 seconds. The conversion ratio to trichlorosilane and the producing ratio of the polymer, which are contained in the reaction gas discharged after the cooling step 1A and after the second cooling step, are shown in Table 1.

Comparative Examples A1 to A4

The conversion reaction is carried out under the same conditions as in Example A1, except that the cooling conditions for the cooling step 1A are set up as indicated in Table 1, and the product gas discharged after the reaction is introduced into the first cooling unit and is cooled. The reaction gas temperature for a time period of 0.01 seconds from the initiation of cooling, the achieving cooling temperature and the time taken to reach the achieving cooling temperature are presented in Table 1. This reaction gas discharged after the cooling step 1A is introduced into an intermediate cooling unit, and the gas temperature is raised and maintained at the temperature indicated in Table 1 for the indicated time. The reaction gas discharged after the intermediate reaction step is introduced into a second cooling unit, and the gas temperature is decreased again to cool the reaction gas to 200° C. within 0.3 seconds. The conversion ratio to trichlorosilane and the producing ratio of the polymer, which are contained in the reaction gas discharged after the cooling step 1A and after the second cooling step, are shown in Table 1.

As shown in Table 1, in all of Examples A1 to A15, the conversion ratio to trichlorosilane is 23% or higher, but the producing ratio of the polymer is 0.2% or less. That is, trichlorosilane is efficiently recovered, and the amount of the polymer is decreased to a large extent. Thus, the burden of removing the polymer depositing on the facilities is markedly reduced.

On the other hand, Comparative Example A1 is an example in which the gas temperature at 0.01 second is excessively low. The conversion ratio to trichlorosilane is about equal to that of Example A1, but the producing ratio of the polymer is 0.5%, and this implies that the polymer is produced in a larger amount than in Example A1.

Comparative Example A2 is an example in which the retention temperature of the intermediate reaction step is excessively high. The conversion ratio to trichlorosilane is low, and the producing ratio of the polymer is high.

Comparative Example A3 is an example in which the retention temperature of the intermediate reaction step is low and the retention time is long. The conversion ratio to trichlorosilane is close to that of Example A1, but the producing ratio of the polymer is high.

Comparative Example A4 is an example in which the cooling rate at the cooling step 1A is low (500° C. in 2.4 seconds), and the intermediate reaction step is not carried out. After the cooling step 1A, the reaction gas is immediately cooled to 200° C. in the second cooling step. For this reason, the conversion ratio to the polymer is suppressed to a low level, but the conversion ratio to trichlorosilane is as low as 20%.

TABLE 1

| | Conversion reaction temperature (° C.) | Cooling step 1A | | | | | Intermediate reaction step | | After second cooling step | |
|---|---|---|---|---|---|---|---|---|---|---|
| | | Temperature at 0.01 sec (° C.) | Achieving cooling temperature (° C.) | Achieving time (sec) | TCS | Pol | Retention temperature (° C.) | Retention time (sec) | TCS | Pol |
| Example A1 | 1100 | 610 | 300 | 0.03 | 26.6 | 1.6 | 550 | 3.0 | 26.7 | 0.1 |
| Example A2 | 1100 | 610 | 300 | 0.03 | 26.6 | 1.6 | 600 | 0.7 | 26.9 | 0.1 |
| Example A3 | 1100 | 610 | 300 | 0.03 | 26.6 | 1.6 | 700 | 0.12 | 27.1 | 0.1 |
| Example A4 | 1100 | 700 | 300 | 0.03 | 26.7 | 1.0 | 500 | 5.0 | 26.4 | 0.2 |
| Example A5 | 1100 | 700 | 300 | 0.03 | 26.7 | 1.0 | 550 | 3.0 | 26.5 | 0.1 |
| Example A6 | 1100 | 700 | 300 | 0.03 | 26.7 | 1.0 | 600 | 0.63 | 26.8 | 0.1 |
| Example A7 | 1100 | 700 | 300 | 0.03 | 26.7 | 1.0 | 700 | 0.10 | 27.0 | 0.2 |
| Example A8 | 1100 | 700 | 300 | 0.03 | 26.7 | 1.0 | 800 | 0.12 | 26.9 | 0.1 |
| Example A9 | 1100 | 700 | 300 | 0.03 | 26.7 | 1.0 | 800 | 0.01 | 27.1 | 0.2 |
| Example A10 | 1100 | 700 | 300 | 0.03 | 26.7 | 1.0 | 900 | 0.14 | 25.9 | 0.1 |
| Example A11 | 1100 | 700 | 300 | 0.03 | 26.7 | 1.0 | 950 | 0.10 | 25.3 | 0.2 |
| Example A12 | 1100 | 700 | 100 | 0.06 | 26.7 | 1.0 | 600 | 0.63 | 26.8 | 0.1 |
| Example A13 | 1100 | 700 | 500 | 0.02 | 26.7 | 1.0 | 600 | 0.63 | 26.8 | 0.1 |
| Example A14 | 1100 | 1030 | 300 | 0.5 | 23.9 | 0.1 | 600 | 0.05 | 23.9 | 0.0 |
| Example A15 | 1100 | 1040 | 500 | 2.0 | 23.0 | 0.1 | 600 | 0.05 | 23.0 | 0.0 |
| Comp. Ex. A1 | 1100 | 440 | 300 | 0.02 | 26.1 | 2.8 | 550 | 3.0 | 26.7 | 0.5 |
| Comp. Ex. A2 | 1100 | 700 | 300 | 0.03 | 26.7 | 1.0 | 960 | 0.12 | 23.7 | 1.4 |
| Comp. Ex. A3 | 1100 | 700 | 300 | 0.03 | 26.7 | 1.0 | 480 | 6.0 | 26.5 | 0.8 |
| Comp. Ex. A4 | 1100 | 1080 | 500 | 2.4 | 20.0 | 0.1 | — | — | 20.0 | 0.1 |

(Remarks) TCS represents the conversion ratio to trichlorosilane (mol %-Si),
Pol represents the producing ratio of the polymer (mol %-Si).

Examples according to the method of the second embodiment of the present invention will be shown together with Comparative Examples. These results are shown in Table 2. Furthermore, an example of changes in the cooling temperature in the second embodiment is shown in FIG. 6. The conversion ratio (mol %-Si) to $SiHCl_3$ in Table 2 is the producing proportion of trichlorosilane to the raw material silicon tetrachloride ($SiCl_4$) ($SiHCl_3/SiCl_4$), and the polymer producing ratio (mol %-Si) is the proportion of silicon contained in the produced polymer with respect to the raw material silicon tetrachloride ($SiCl_4$) (Si in polymer/$SiCl_4$).

Examples B1 to B5

A mixed gas of hydrogen and silicon tetrachloride (molar ratio of $H_2$ and $SiCl_4$, $H_2/SiCl_4$=2.0) is used as a raw material, and the raw material gas is introduced into a conversion furnace and is allowed to react at 1040° C. The product gas discharged after the reaction is introduced into a first cooling unit, and is cooled to 300° C. The reaction gas temperature for a time period of 0.01 seconds from the initiation of cooling, and the achieving cooling temperature are presented in Table 2. This reaction gas discharged after the cooling step 1B is introduced into an intermediate cooling unit, and the gas temperature is raised and maintained at the temperature indicated in Table 2 for the indicated time. The reaction gas discharged after the intermediate reaction step is introduced into a second cooling unit, and the gas temperature is lowered again to cool the reaction gas to 200° C. within 0.3 seconds. The amounts of trichlorosilane and the polymer contained in the reaction gas discharged after the second cooling step are shown in Table 2.

Examples B6 to B9

The conversion reaction is carried out under the same conditions as in Example B1, except that the conversion reaction temperature is set at 1100° C. The product gas discharged after the reaction is introduced into the first cooling unit to be cooled to 300° C. The reaction gas temperature for a time period of 0.01 seconds from the initiation of cooling, and the achieving cooling temperature are presented in Table 2. This reaction gas discharged after the cooling step 1B is introduced into an intermediate cooling unit, and the gas temperature is raised and maintained at the temperature indicated in Table 2 for the indicated time. The reaction gas discharged after the intermediate reaction step is introduced into a second cooling unit, and cooling is carried out under the same conditions as in Example B1. The amounts of trichlorosilane and the polymer contained in the reaction gas discharged after the second cooling step are shown in Table 2.

Examples B10 to B12

The conversion reaction is carried out under the same conditions as in Example B1, except that the conversion reaction temperature is set at 1100° C. The product gas discharged after the reaction is introduced into the first cooling unit to be cooled to 100° C. The reaction gas temperature for a time period of 0.01 seconds from the initiation of cooling, and the achieving cooling temperature are presented in Table 2. This reaction gas discharged after the cooling step 1B is introduced into an intermediate cooling unit, and the gas temperature is raised and maintained at the temperature indicated in Table 2 for the indicated time. The reaction gas discharged after the intermediate reaction step is introduced into a second cooling unit, and cooling is carried out under the same conditions as in Example B1. The amounts of trichlorosilane and the polymer contained in the reaction gas discharged after the second cooling step are shown in Table 2.

Comparative Examples B1 and B2

The conversion reaction and the cooling step 1B are carried out under the same conditions as in Example B1, except that the intermediate reaction step is not carried out (Comparative Example B1). The conversion reaction and the cooling step 1B are carried out under the same conditions as in Example B1, except that the retention temperature and the retention time of the intermediate reaction step are set as indicated in Table 2 (Comparative Example B2).

Comparative Examples B3 to B5

The conversion reaction and the cooling step 1B are carried out under the same conditions as in Example B6, except that the intermediate reaction step is not carried out (Comparative Example B3). The conversion reaction and the cooling step 1B are carried out under the same conditions as in Example B6, except that the retention temperature and the retention time of the intermediate reaction step are set as indicated in Table 2 (Comparative Example B4).

The conversion reaction and the cooling step 1B are carried out under the same conditions as in Example B11, except that the intermediate reaction step is not carried out (Comparative Example B5).

As shown in Table 2, in all of Examples B1 to B12, the conversion ratio to trichlorosilane is 21% or greater, but the producing ratio of the polymer is 0.4% or less. That is, trichlorosilane is efficiently recovered, and the amount of the polymer is decreased to a large extent. Thus, the burden of removing the polymer depositing on the facilities is markedly reduced.

On the other hand, in Comparative Examples B1 to B5, the conversion ratios to trichlorosilane are about equal to those of Examples B1 to B12, but the producing ratios of the polymer are 1.4% or greater. Particularly, in the Comparative Examples in which the intermediate reaction step is not carried out (Comparative Examples B1, B3 and B5), the producing ratio of the polymer is 1.7% to 2.8%, and the producing ratio of the polymer is significantly high as compared with Examples B1 to B12.

TABLE 2

| | Conversion reaction temperature (° C.) | Cooling step 1B | | Intermediate reaction step | | Reaction ratio (after second cooling step) | |
|---|---|---|---|---|---|---|---|
| | | Temperature at 0.01 sec (° C.) | Achieving cooling temperature (° C.) | Retention temperature (° C.) | Retention time (sec) | SiHCl$_3$ (mol % Si) | Polymer (mol % Si) |
| Example B1 | 1040 | 573 | 300 | 500 | 5.0 | 23.8 | 0.4 |
| Example B2 | 1040 | 573 | 300 | 550 | 4.1 | 23.8 | 0.2 |
| Example B3 | 1040 | 573 | 300 | 660 | 0.30 | 24.0 | 0.1 |
| Example B4 | 1040 | 573 | 300 | 800 | 0.18 | 23.8 | 0.1 |
| Example B5 | 1040 | 573 | 300 | 950 | 0.26 | 21.0 | 0.4 |
| Example B6 | 1100 | 590 | 300 | 600 | 1.1 | 26.8 | 0.1 |
| Example B7 | 1100 | 590 | 300 | 660 | 0.29 | 26.9 | 0.0 |
| Example B8 | 1100 | 590 | 300 | 840 | 0.18 | 25.4 | 0.2 |
| Example B9 | 1100 | 590 | 300 | 900 | 0.24 | 23.6 | 0.2 |
| Example B10 | 1100 | 440 | 100 | 800 | 0.25 | 25.6 | 0.1 |
| Example B11 | 1100 | 440 | 100 | 800 | 0.19 | 26.7 | 0.1 |
| Example B12 | 1100 | 440 | 100 | 800 | 0.01 | 27.1 | 0.2 |
| Comp. Ex. B1 | 1040 | 573 | 300 | Absent | | 23.5 | 1.7 |
| Comp. Ex. B2 | 1040 | 573 | 300 | 480 | 6.0 | 23.6 | 1.4 |
| Comp. Ex. B3 | 1100 | 590 | 300 | Absent | | 26.5 | 1.7 |
| Comp. Ex. B4 | 1100 | 590 | 300 | 960 | 0.24 | 21.8 | 1.3 |
| Comp. Ex. B5 | 1100 | 440 | 100 | Absent | | 26.1 | 2.8 |

The invention claimed is:

1. A method for producing trichlorosilane by cooling a reaction gas and recovering trichlorosilane, the method comprising:
a reaction gas producing step in which silicon tetrachloride and hydrogen, as raw material, are subject to a conversion reaction at a temperature of equal to or higher than 1000° C. and equal to or lower than 1900° C., to produce a reaction gas containing trichlorosilane, dichlorosilylene, hydrogen chloride and high-order silane compounds;
a cooling step 1A in which the reaction gas discharged from the conversion furnace after the reaction gas producing step is cooled to 600° C. or higher within 0.01 seconds from the initiation of cooling and to 500° C. or lower within 2 seconds;
an intermediate reaction step in which said reaction gas discharged after the first cooling step 1A is maintained in a temperature range of equal to or higher than 500° C. and equal to or lower than 950° C. for a time period of equal to or longer than 0.01 seconds and equal to or shorter than 5 seconds; and
a second cooling step in which said reaction gas discharged after the intermediate reaction step is cooled to below 500° C.

2. The method for producing trichlorosilane according to claim 1, wherein in the cooling step 1A, the achieving cooling temperature of the reaction gas is equal to or higher than 100° C. and equal to or lower than 500° C.

3. The method for producing trichlorosilane according to claim 1, wherein in the intermediate reaction step, the reaction gas is maintained at a temperature of equal to or higher than 550° C. and equal to or lower than 800° C.

4. The method for producing trichlorosilane according to claim 1, wherein in the cooling step 1A, the reaction gas is cooled such that the achieving cooling temperature is equal to or higher than 100° C. and equal to or lower than 500° C., and the cooled reaction gas is maintained at a temperature equal to or higher than 550° C. and equal to or lower than 800° C. in the intermediate reaction step.

5. A method for producing trichlorosilane by cooling a reaction gas and recovering trichlorosilane, the method comprising:
a reaction gas producing step in which silicon tetrachloride and hydrogen, as raw material, are subjected to a conversion reaction at a temperature of equal to or higher than 1000° C. and equal to or lower than 1900° C., to produce a reaction gas containing trichlorosilane, dichlorosilylene, hydrogen chloride and high-order silane compounds;
a cooling step 1B in which the reaction gas discharged from the conversion furnace after the reaction gas producing step is cooled to below 600° C. within 0.01 seconds;
an intermediate reaction step in which said reaction gas discharged after the first cooling step 1B is maintained in a temperature range of equal to or higher than 500° C. and equal to or lower than 950° C. for a time period of equal to or longer than 0.01 seconds and equal to or shorter than 5 seconds; and
a second cooling step of in which said reaction gas discharged after the intermediate reaction step is cooled to below 500° C.,
wherein after the second cooling step, an amount of silicon atoms in produced polymers, which are high-order chlorosilanes containing two or more silicon atoms, is equal to or less than 0.4 mol % with respect to silicon atoms in the raw material silicon tetrachloride.

6. The method for producing trichlorosilane according to claim 5, wherein in the cooling step 1B, the achieving cooling temperature of the reaction gas is equal to or higher than 100° C. and equal to or lower than 500° C.

7. The method for producing trichlorosilane according to claim 5, wherein in the intermediate reaction step, the reaction gas is maintained at a temperature of equal to or higher than 550° C. and equal to or lower than 800° C.

8. The method for producing trichlorosilane according to claim 5, wherein in the cooling step 1B, the reaction gas is cooled such that the achieving cooling temperature is equal to or higher than 100° C. and equal to or lower than 500° C., and the cooled reaction gas is maintained at a temperature equal to or higher than 550° C. and equal to or lower than 800° C. in the intermediate reaction step.

* * * * *